United States Patent
Rackes et al.

(10) Patent No.: US 11,371,736 B2
(45) Date of Patent: Jun. 28, 2022

(54) OPTIMAL REAL-TIME OUTCOME-BASED VENTILATION RATE CONTROL FOR BUILDINGS

(71) Applicant: Drexel University, Philadelphia, PA (US)

(72) Inventors: Adams Edwin Rackes, Philadelphia, PA (US); Michael Shannon Waring, Philadelphia, PA (US); Tom Ben David, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 15/730,515

(22) Filed: Oct. 11, 2017

(65) Prior Publication Data

US 2018/0163987 A1 Jun. 14, 2018

Related U.S. Application Data

(60) Provisional application No. 62/406,887, filed on Oct. 11, 2016.

(51) Int. Cl.
*F24F 11/47* (2018.01)
*F24F 11/00* (2018.01)
(Continued)

(52) U.S. Cl.
CPC .......... *F24F 11/47* (2018.01); *F24F 11/0001* (2013.01); *F24F 11/74* (2018.01);
(Continued)

(58) Field of Classification Search
CPC ........ F24F 11/47; F24F 11/74; F24F 11/0001; F24F 2110/10
See application file for complete search history.

(56) References Cited

U.S. PATENT DOCUMENTS

| | | | |
|---|---|---|---|
| 4,909,041 A * | 3/1990 | Jones .................. | F24D 11/0214 62/99 |
| 2005/0095978 A1* | 5/2005 | Blunn .................. | F24F 11/0001 454/229 |

(Continued)

OTHER PUBLICATIONS

Otto Hänninen, Impact of the Implementation of the Ventilation Guidelines on Burden of Disease, by National Institute for Health and Welfare, [online], Jan. 2013 [retrieved on Feb. 11, 2019], Retrieved from <https://webgate.ec.europa.eu/chafea_pdb/assets/files/pdb/20091208/20091208_d08_oth8_en_ps.pdf> (Year: 2013).*

(Continued)

*Primary Examiner* — Thomas C Lee
*Assistant Examiner* — Charles Cai
(74) *Attorney, Agent, or Firm* — Schott, P.C.

(57) ABSTRACT

The framework herein may be called outcome-based ventilation (OBV) for evaluating ventilation rates (VR) in commercial buildings and using a system to make informed control decisions based on the resultant indoor air quality (IAQ) and energy consumption outcomes. A ventilation control system includes a ventilation system that provides air circulation to a building and a controller that controls the ventilation system based on input that include a current ventilation rate. The system also includes an optimization system that drives the controller based on factors like building and pollution transport models, scientific estimates of ventilation impacts on productivity, sick leave, and health, user preference parameters, and weather, pollution, and price forecasts.

18 Claims, 7 Drawing Sheets

(51) Int. Cl.

| | |
|---|---|
| *F24F 11/74* | (2018.01) |
| *F24F 120/14* | (2018.01) |
| *F24F 110/70* | (2018.01) |
| *F24F 110/66* | (2018.01) |
| *F24F 110/10* | (2018.01) |
| *F24F 13/28* | (2006.01) |
| *F24F 11/76* | (2018.01) |
| *F24F 110/74* | (2018.01) |
| *F24F 110/30* | (2018.01) |
| *F24F 130/10* | (2018.01) |

(52) U.S. Cl.
CPC ............... *F24F 13/28* (2013.01); *F24F 11/76* (2018.01); *F24F 2110/10* (2018.01); *F24F 2110/30* (2018.01); *F24F 2110/66* (2018.01); *F24F 2110/70* (2018.01); *F24F 2110/74* (2018.01); *F24F 2120/14* (2018.01); *F24F 2130/10* (2018.01); *G05B 2219/2614* (2013.01); *G05B 2219/2642* (2013.01)

(56) References Cited

U.S. PATENT DOCUMENTS

| | | | | |
|---|---|---|---|---|
| 2006/0000257 | A1* | 1/2006 | Samadpour | G16H 50/80 73/23.2 |
| 2009/0105867 | A1* | 4/2009 | Yamaguchi | C23C 16/46 700/121 |
| 2010/0082161 | A1* | 4/2010 | Patch | F24F 11/0001 700/276 |
| 2014/0277767 | A1* | 9/2014 | Othman | G05D 23/1917 700/278 |
| 2016/0018119 | A1* | 1/2016 | Desmet | F04D 25/088 165/237 |
| 2016/0334122 | A1* | 11/2016 | Shiel | F24F 11/0001 |
| 2018/0046164 | A1* | 2/2018 | Drees | G05B 13/0265 |

OTHER PUBLICATIONS

Pawel Wargocki, etc., "The Effects of Outdoor Air Supply Rate in an Office on Perceived Air Quality, Sick Building Syndrome (SBS) Symptoms and Productivity", published in year 2000 on "indoor Air" ISSN 09095-6947, 2000,10:222-236. (Year: 2000).*

Allen JG, et al., "Associations of Cognitive Function Scores with Carbon Dioxide, Ventilation, and Volatile Organic Compound Exposures in Office Workers: A Controlled Exposure Study of Green and Conventional Office Environments," Environmental Health Perspectives, Oct. 2015. Oct. 26, 2015 http://ehp.niehs.nih.gov/15-10037. Accessed Nov. 25, 2015.

ASHRAE, "Ventilation for Acceptable Indoor Air Quality," Atlanta, GA: ASHRAE; 2013.

Ben-David T, Rackes A, Waring MS., "Alternative ventilation strategies in U.S. offices: Saving energy while enhancing work performance, reducing absenteeism, and considering outdoor pollutant exposure tradeoffs," Building and Environment, 2017;116:140-157.

Carrer P, Wargocki P, Fanetti A, et al., "What does the scientific literature tell us about the ventilation-health relationship in public and residential buildings?" Building and Environment, 2015;94, Part 1:273-286.

Chan WR, Parthasarathy S, Fisk WJ, Mckone TE., "Estimated effect of ventilation and filtration on chronic health risks in U.S. offices, schools, and retail stores," Indoor Air 2016:26:331-343.

Dutton SM, Banks D, Brunswick SL, Fisk WJ, "Health and economic implications of natural ventilation in California offices," Building and Environment, 2013;67:34-45.

Fann N, Lamson AD, Anenberg SC, et. al. "Estimating the national public health burden associated with exposure to ambient PM2.5 and ozone," Society for Risk Analysis, 2011;32:81-95.

Fisk WJ, Black D, Brunner G., "Changing ventilation rates in U.S. offices: Implications for health, work performance, energy, and associated economics," Building and Environment, 2012;47:368-372.

Fisk WJ, Mirer AG, Mendell MJ, "Quantitative relationship of sick building syndrome symptoms with ventilation rates," Indoor Air. 2009; 19:159-165.

Interagency Working Group on Social Cost of Greenhouse Gases, "Technical Support Document:—Technical Update of the Social Cost of Carbon for Regulatory Impact Analysis," Washington, DC: Interagency Working Group on Social Cost of Greenhouse Gases, United States Government; 2016. Aug. 2016. https://www.epa.gov/sites/production/files/2016-12/documents/sc_co2_tsd_august_2016.pdf. Accessed Feb. 22, 2017.

Laden F, Schwartz J, Speizer FE, Dockery DW., "Reduction in Fine Particulate Air Pollution and Mortality: Extended Follow-up of the Harvard Six Cities Study," American Journal of Respiratory and Critical Medical Care. 2006;173:667-672.

Logue JM, Price PN, Sherman MH, Singer BC., "A Method to Estimate the Chronic Health Impact of Air Pollutants in U.S. Residences," Environmental Health Perspectives, 2012;120:216-222.

Machol B, Rizk S., "Economic value of U.S. fossil fuel electricity health impacts," Environment International, 2013;52:75-80.

Multon DK, Glencross PM, Walters MD, "Risk of Sick Leave Associated with Outdoor Air Supply Rate, Humidification, and Occupant Complaints," Indoor Air. 2000;10:212-221.

Pope CA, Burnett RT, Thun MJ, et al., "Lung cancer, cardiopulmonary mortality, and long-term exposure to fine particulate air pollution," JAMA, American Medical Association. 2002;287:1132-1141.

Rackes A, Waring MS., "Alternative ventilation strategies in U.S. offices: Comprehensive assessment and sensitivity analysis of energy saving potential," Building and Envrionment, 2017;116:30-44.

Rackes A, Waring MS., "Using multiobjective optimizations to discover dynamic building ventilation strategies that can improve indoor air quality and reduce energy use," Energy and Buildings, 2014;75:272-280.

Riley WJ, Mckone TE, Lai ACK, Nazaroff WW., "Indoor Particulate Matter of Outdoor Origin: Importance of Size-Dependent Removal Mechanisms," Environmental Science Technology, 2002;36:200-207.

Satish U, Mendell MJ, Shekhar K, et al., "Is CO2 an Indoor Pollutant? Direct Effects of Low-to-Moderate CO2 Concentrations on Human Decision-Making Performance," Environmental Health Perspectives, Sep. 2012. Sep. 20, 2012. http://ehp.niehs.nih.gov/2012/12/1104789/. Accessed Nov. 25, 2015.

Seppänen OA, Fisk WJ, Lei QH, "Ventilation and performance in office work," Indoor Air. 2006;16:28-36.

Sundell J, Levin H, Nazaroff WW, et al., "Ventilation rates and health: multidisciplinary re-view of the scientific literature," Indoor Air. 2011;21:191-204.

U.S. EPA, "Inventory of U.S. Greenhouse Gas Emissions and Sinks, 1990-2014," Washington, DC: U.S. Environmental Protection Agency; 2016. 2016. https://www.epa.gov/sites/production/files/2016-04/documents/us-ghg-inventory-2016-main-text.pdf. Accessed Feb. 22, 2017, Chapter 3, Section 3.1, pp. 3-1-3-16.

U.S. EPA, "The Benefits and Costs of the Clean Air Act, 1990 to 2010: EPA Report to Congress," U.S. Environmental Protection Agency; 1999. Nov. 1999. https://www.epa.gov/sites/production/files/2015-07/documents/fullrept.pdf. Accessed Jul. 20, 2016, Chapters 5 and 6, pp. 51-76.

* cited by examiner

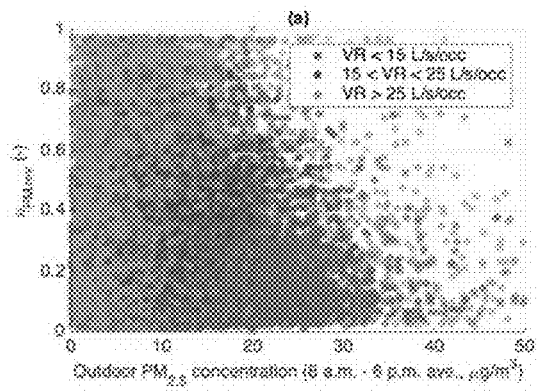 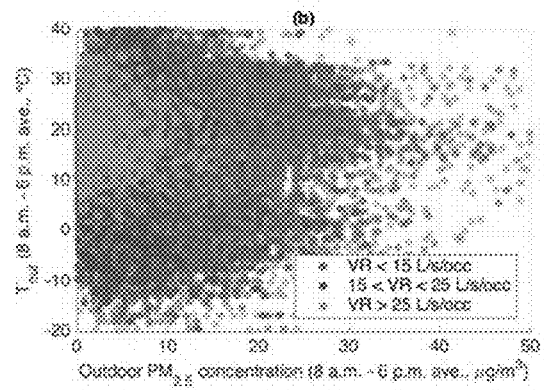
FIG. 9(a)  FIG. 9(b)
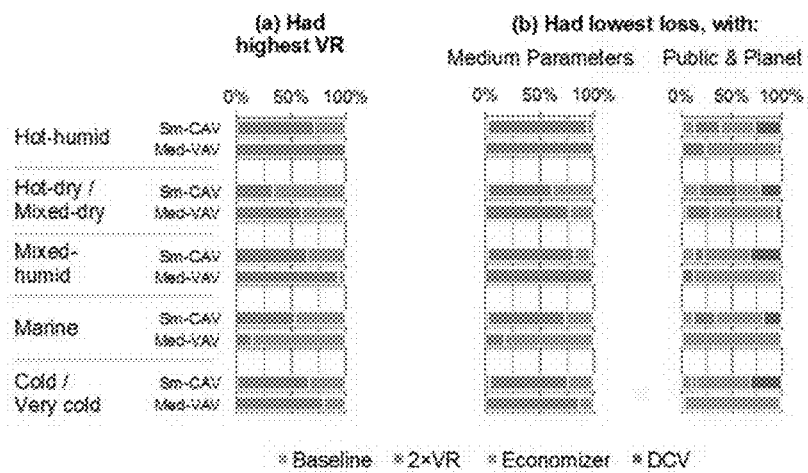
FIG. 10(a)  FIG. 10(b)
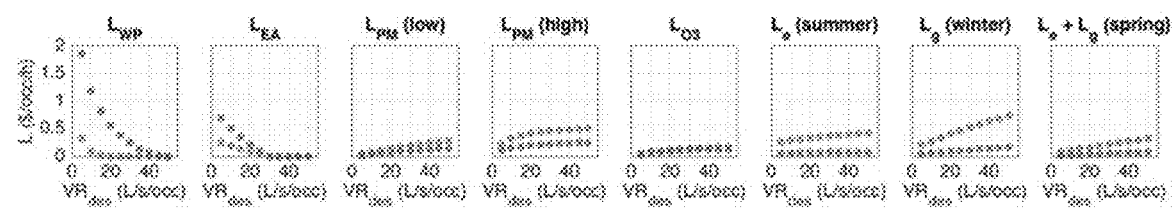
FIG. 11

Table 1 Summary of social cost estimate ranges for electricity generation for the U.S. grid, in U.S. cents (¢) per kWh.

| | Climate impacts | Combustion-related health impacts | Other impacts, e.g. crops, extraction | Social costs, U.S. electric grid (¢/kWh) |
|---|---|---|---|---|
| Social cost of carbon | ✓ | | | 0.9–15.5 |
| Combustion PM$_{2.5}$ impacts on public health | | ✓ | | 14.0–35.0 |
| "Gross external damages" | | ✓ | ✓ | 1.6 |
| "Social cost of atmospheric release" | ✓ | ✓ | ✓ | 6.5–20.1 |
| Total coal lifecycle | ✓ | ✓ | ✓ | 3.9–11.6 |
| Coal lifecycle (excluding climate and combustion) | | | ✓ | 2.3–3.1 |
| SUM of non-overlapping social costs | ✓ | ✓ | ✓ | 4.8–53.6 |
| SUM of costs, excluding combustion-related health | ✓ | ☐ | ✓ | 3.2–18.6 |

FIG. 15

OPTIMAL REAL-TIME OUTCOME-BASED VENTILATION RATE CONTROL FOR BUILDINGS

CROSS-REFERENCE TO RELATED APPLICATION

This application claims the benefit of U.S. Provisional Application No. 62/406,887, filed Oct. 11, 2016, which is incorporated by reference as if fully set forth herein.

STATEMENT REGARDING GOVERNMENT SUPPORT

This invention was made with government support under Contract No. 1511151 awarded by the U.S. National Science Foundation. The government has certain rights in the invention.

BACKGROUND

Ventilation, and in particular controlled ventilation controls many interior variables that people often discuss: it dilutes indoor pollutants, introduces outdoor pollutants, and affects chemistry. And people further know that pollutant concentration changes affect health, comfort, work performance. Thus, how building owner's or office mangers control airflow into their environment affects energy consumption, often substantially.

Traditionally, however, ventilation systems usually include adjustable humidity and temperature settings. These simple factors are usually based upon human desire for certain temperature settings, and rarely adjusted except in extreme heat or cold in order to accommodate a median desire.

Such a haphazard approach, while keeping the HVAC controlled climate in a building at a generally acceptable level, may overlook other environmental favors such as shifting ventilation rates in response to outdoor pollution cycles, energy prices, or occupancy patterns, or accepting a small loss in one outcome for a large gain in another. To address these requirements, a systems-level decision-making framework that considers these and other factors may be useful.

Ventilation's principal purpose is diluting indoor-emitted pollutants, reducing odors as well as potentially unhealthy or irritating chemical exposures. Low ventilation rates (VR) are associated with increased illness, greater prevalence of sick building syndrome (SBS) symptoms, and reduced task performance. VRs that significantly exceed current minimum standards have also been associated with significant cognitive and task performance increases and sick leave reductions. Ventilation control also affects broader public health risks, for example by introducing outdoor air pollutants like fine particulate matter (PM2.5=particles with aerodynamic diameter <2.5 µm) and ozone (O3), both of which have well-established, no-threshold associations with multiple adverse short- and long-term health endpoints, including mortality.

In addition to these many indoor air quality (IAQ) implications, current ventilation practice accounts for ~¼ of HVAC energy consumed by commercial buildings. Though increasing VRs generally increases energy use, in some settings and weather conditions it can also save energy by economizing.

The most influential decisions about ventilation rely on minimum VRs set by regulatory standards. The minimum VR for office spaces specified by ASHRAE Standard 62.1 (and its precursor Standard 62) has fluctuated significantly, from 7.5 L/s/occ in the first version in 1973, to 2.5 L/s/occ (for non-smoking spaces) in 1981, to 10 L/s/occ in 1989, to 8.5 L/s/occ (at default occupant density) from 2004 to the present. VR standards worldwide similarly require between 3 and 10 L/s/occ in offices. These values persist despite a 2011 conclusion of more than a dozen experts that "increasing ventilation rates above currently adopted standards and guidelines should result in reduced prevalence of negative health outcomes." Setting minimum VRs "has always been challenging based on limited research results to support specific values, pressures by some to lower rates based on energy considerations, and pressures by others to raise them based on IAQ benefits."

Meanwhile, a number of research efforts have attempted to compare the multiple costs and bene-fits that create those pressures. Some have shown the economic benefits of increasing the minimum VR in US offices from 8 to 15 L/s/occ, owing to improved work performance and reduced absence at the higher VR, were about 200 times the additional energy costs. Natural ventilation could expose office workers to outdoor pollutants whose public health impacts over-whelmed the benefits of reduced SBS symptoms, in economic terms. Specific alternative ventilation strategies may be demand-controlled ventilation and economizer control in offices, in terms of (i) profitable IAQ outcomes (work performance and reduced absenteeism), (ii) IAQ public health outcomes (from indoor exposure to outdoor PM2.5 and ozone); (iii) and energy consumption outcomes.

SUMMARY OF THE EMBODIMENTS

The invention comprises a system and a method for optimal control of ventilation in commercial buildings that is based on maximizing the value of the expected outcomes of ventilation control to the building operator ("the user").

The framework herein may be called outcome-based ventilation (OBV) for evaluating ventilation rates (VR) in commercial buildings and using a system to make informed control decisions based on the resultant indoor air quality (IAQ) and energy consumption outcomes. A loss function combines outcomes, using scientific knowledge to establish the form of ventilation-outcome relations, and user-selected parameters to adjusted for preferences; therefore, minimizing loss optimizes ventilation for a given decision-maker. The approach was developed for offices and included six outcomes: occupant work performance and sick leave absenteeism (profitable IAQ outcomes), health risks from exposure to fine particles and ozone from outdoors (IAQ public health outcomes), and electricity and natural gas consumption (energy outcomes). Low, medium (central estimate), and high reference values were established for user parameters. Applying medium parameters to a dataset representing the office stock, median loss changes in $/occ/h from an intervention that increased VRs by ~10 L/s/occ were: −0.36 (work performance), −0.21 (excess absence), 0.02 (PM2.5 exposure), 0.01 (ozone exposure), 0.00 (electricity use), and 0.00 (natural gas use). Work performance and absenteeism nearly always remained dominant unless a user selected low parameters for profitable IAQ outcomes and high values for public health and energy outcomes.

BRIEF DESCRIPTION OF THE EMBODIMENTS

FIG. 1 shows excess absence rate $r_{EA}$ as a function of total ventilation rate (VR), at central estimate, 95% confidence interval (CI), and selected estimate percentiles (EP).

Figure 4A:
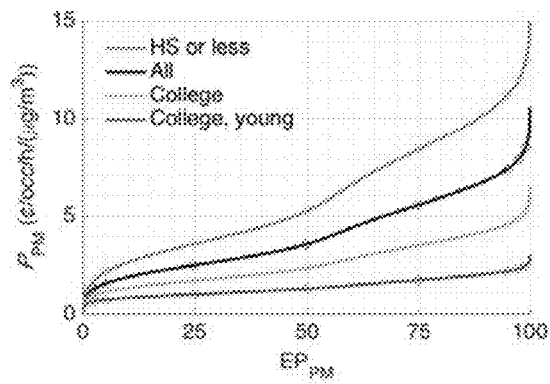
Figure 4B:
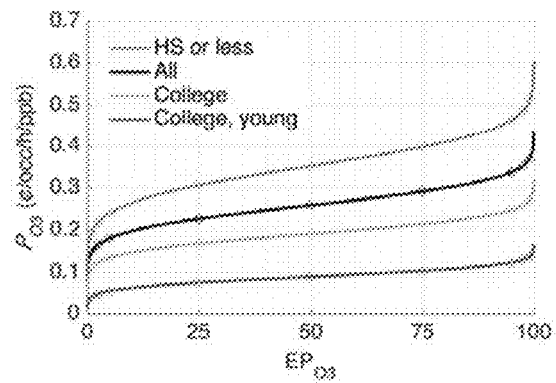

FIGS. 4(a) and 4(b) shows unit prices for PM2.5 and ozone exposure expressed in cents (¢), derived from sampling public health concentration-response functions and endpoint monetary values, versus the estimate percentile (EP) of the Monte Carlo results.

Figure 5:
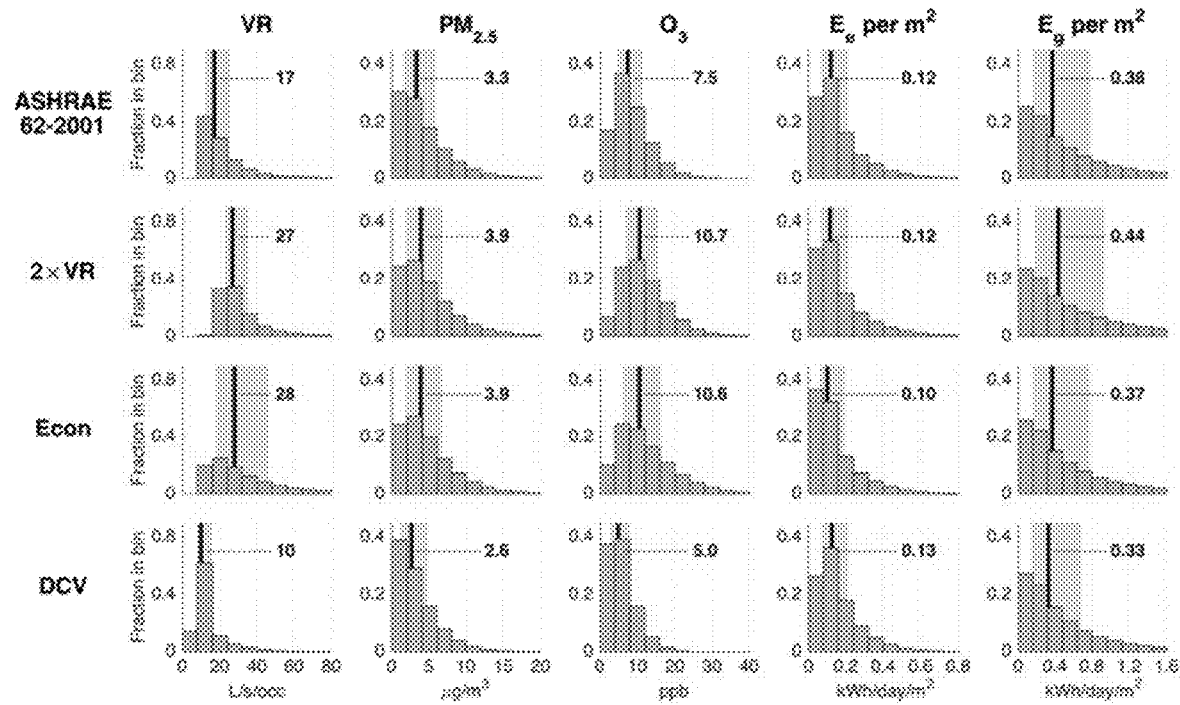

FIG. 5 shows day-resolved histograms for five outcomes—total (mechanical+natural) ventilation rate (VR), PM2.5 and O3 indoor concentrations, and electricity and natural gas daily use intensities—for four ventilation strategies. In the background, the dark line with the numerical label indicates the median and the gray box extends from the 25th to 75th percentile of instances.

Figure 6A:
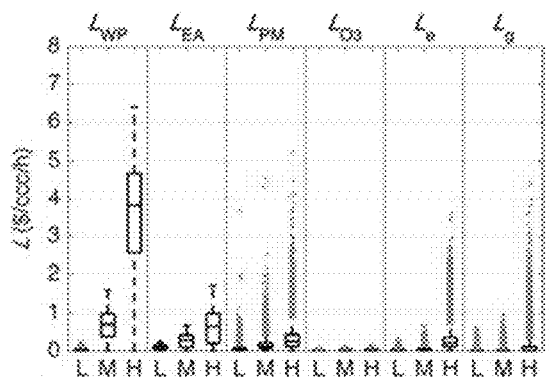

FIG. 6(a) shows magnitude of loss components for ASHRAE 62-2001. Magnitudes and changes are shown at low (L), medium (M), and high (H) parameter reference values.

Figure 6B:
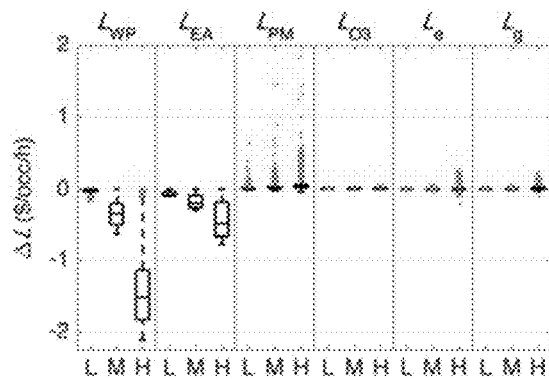

FIG. 6(b) shows loss component changes when switching from ASHRAE 62-2001 to 2×VR. Magnitudes and changes are shown at low (L), medium (M), and high (H) parameter reference values.

Figure 7:
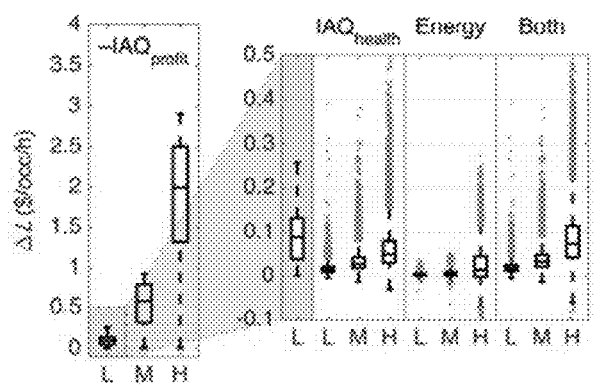

FIG. 7 shows change in loss moving from ASHRAE 62-2001 to 2×VR, shown on the left for the negation of $IAQ_{profit}$ at three levels, and then enlarged on the right to include low-valued $IAQ_{profit}$ and all three levels for $IAQ_{health}$, energy, and their sum.

Figure 8:
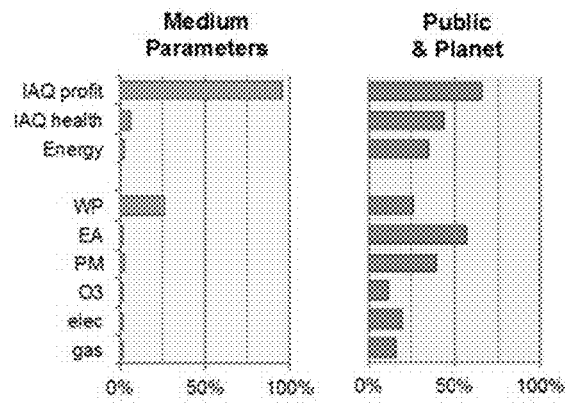

FIG. 8 shows the impact of loss function elements on ventilation strategy decision-making. Percentage of day instances where removing an outcome changed the outcome-based VR (among the options available by at least 1 L/s/occ).

FIGS. 9a and 9b show for the Public & Planet user profile, lowest-loss VR bin membership as a function of (a) outdoor $PM_{2.5}$ concentration and $PM_{2.5}$ filter efficiency, and (b) outdoor $PM_{2.5}$ concentration and outdoor temperature.

FIG. 10(a) shows frequency that each ventilation strategy achieved the highest annual VR, by climate category and office type.

FIG. 10(b) shows frequency that each ventilation strategy had the lowest loss of the four options, for Medium Parameters and Public & Planet user profiles.

FIG. 11 shows loss component values as a function of $VR_{des}$ with Medium Parameters (blue) or Public & Planet (orange) user profiles.

Figure 12:
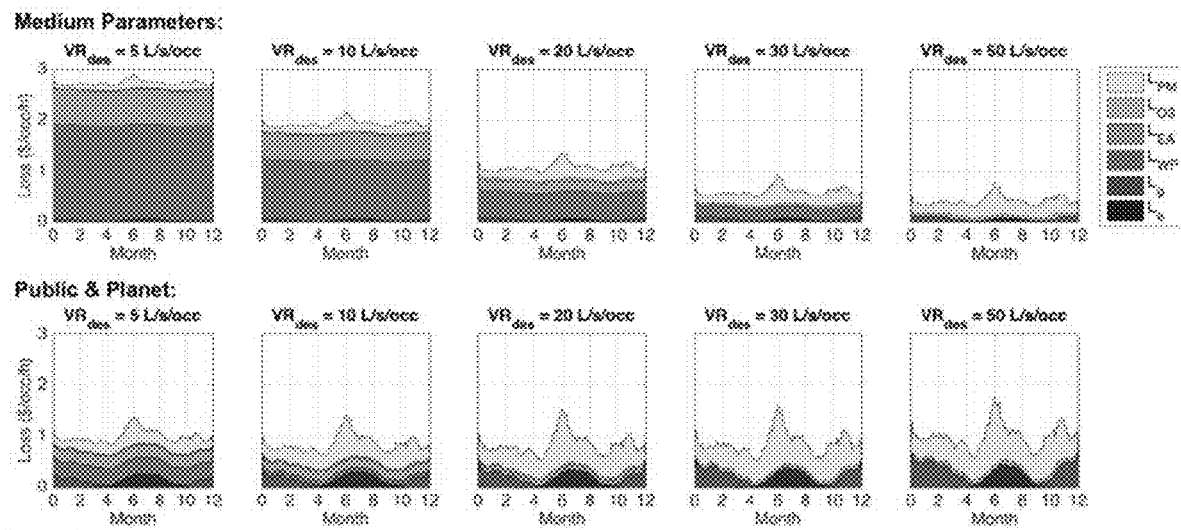

FIG. 12 shows loss magnitudes for six components over a year, for Medium Parameters and Public & Planet user profiles, each at five ventilation rates, for the case study building with a typical filter ($\eta_{PM,mv}=0.2$).

Figure 13:
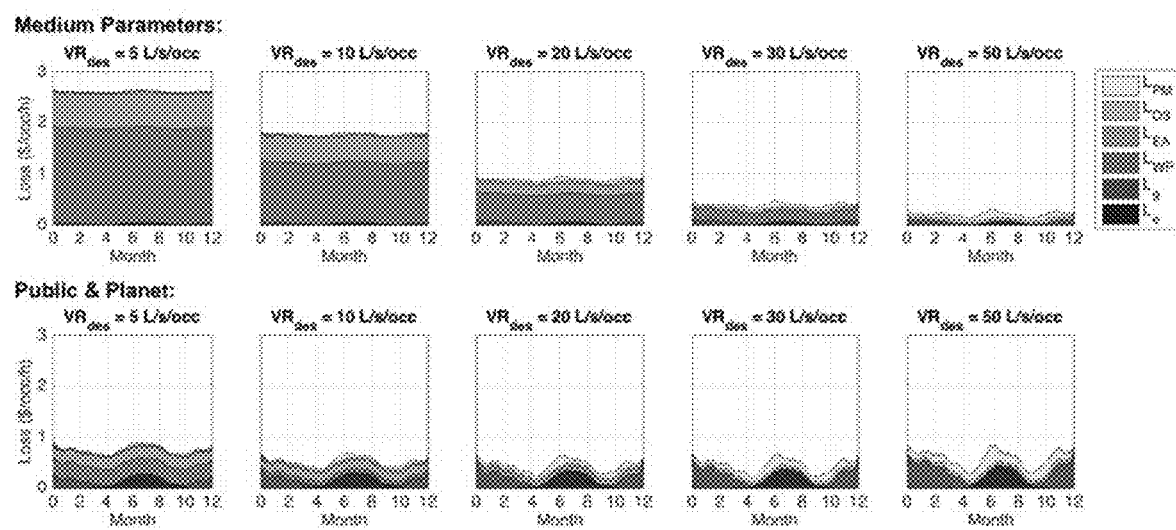

FIG. 13 shows loss magnitudes for six components over a year, for Medium Parameters and Public & Planet user profiles, each at five ventilation rates, for the case study building with a superior filter ($\eta_{PM,mv}=0.7$).

Figure 14:
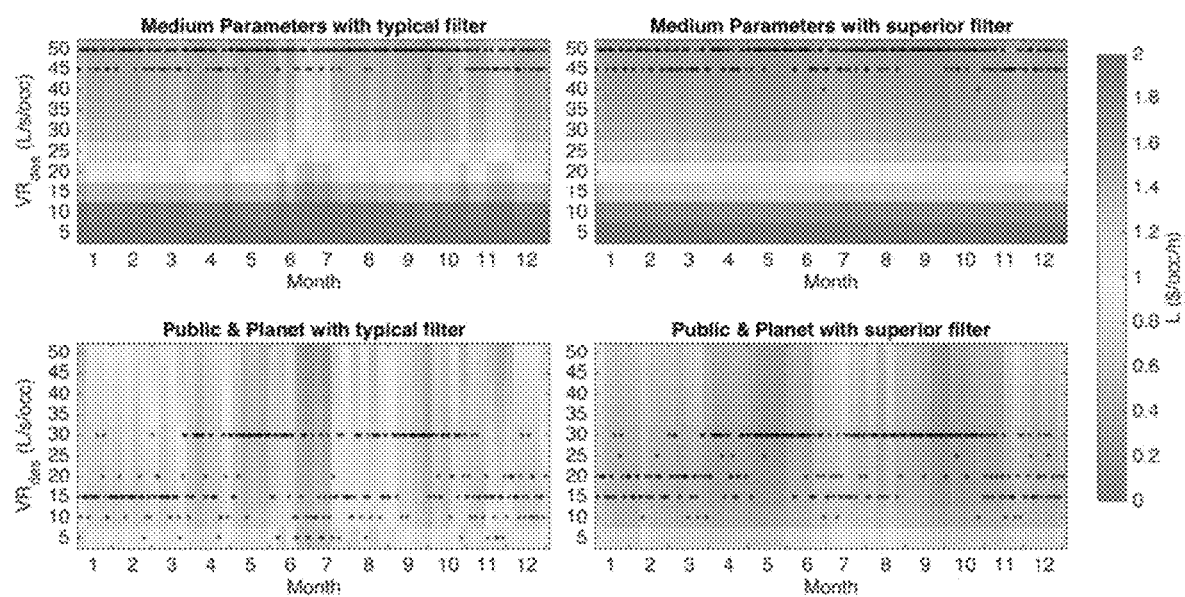

FIG. 14 shows heat maps showing the total loss throughout the year for different design ventilation rates ($VR_{des}$) for two user profiles, each with a typical or a superior filter. Black dots indicate the outcome-based $VR_{des}$, i.e. the one that had lowest loss.

FIG. 15 shows Table 6.

DETAILED DESCRIPTION OF THE EMBODIMENTS

1. Introduction

This control system described herein may control ventilation, or introduction of outdoor air, in commercial buildings. Existing ventilation methods either used a fixed minimum ventilation rate, or variations on schemes triggered by outdoor air temperature/enthalpy or occupancy detection (typically by a surrogate measure like CO2 concentration). But these often fail to take into account some of the most significant and commercially valuable outcomes of ventilation control like changes in productivity. Furthermore, existing approaches cannot adjust based on other important input signals and sources of information, like outdoor pollution levels or current electricity prices in a smart grid. The control system discussed herein draws on various data sources to control ventilation in a holistic way to benefit end-users.

1.1 System Implementation

The system may include sensors and interfaces to retrieve data on current operating and environmental conditions in the building, near-term weather and pollution forecasts from web-based sources, and forecasts for real-time electricity prices in a dynamic smart grid; computational methods to use this information to determine an optimal ventilation rate in real-time; and network architecture to facilitate data acquisition, transmit it to a cloud-based platform for computation, and return a control signal to the building as well as feed information on operating conditions and human and environmental impacts to dashboard type visualization to show users, particularly in green or healthy buildings.

All of these data sources may feed an optimization system that drives a controller that controls the ventilation system based on certain factors and calculations derived from the inputs. The calculations may be preset by a user, the optimization system itself, or a combination of the two. The optimization system may be on the cloud or based in controller hardware, or a combination of the two.

Given the findings below and based on the logic that flows therefrom, the optimization system is dynamic and changes operating and environmental strategies to meet the needs that a user identifies as important. Such changes can be implemented in real time or in advance of upcoming environmental factors such as approaching weather or pollution patterns.

The system may include a setup that includes an initial preference elicitation step to determine user preferences and a site survey to determine important building parameter values. A set of physical process models predict indoor particulate matter and ozone concentrations and electricity and natural gas use as a function of ventilation. A set of valuation models predict and assign user-weighted values to concomitant impacts on work performance, sick leave, long-term health costs, and energy consumption. An optimization routine may use these models, combined into a loss function, to determine the ventilation rate trajectory that will incur the least loss, i.e., have the least negative value to the user. The first step of that trajectory may be implemented, and the process iterate at a next timestep. The result is a system that very nearly produces the optimal combination of expected outcomes of ventilation, based on the user's stated preferences.

The optimization system may drive a controller that controls an HVAC system, including temperature, flow rates, humidity, filtration, pressure, odor, and other factors described herein.

2. Methods 2.1 Minimizing Loss

The basic principle of this outcome-based ventilation (OBV) decision-making framework is that well-characterized positive and negative consequences of ventilating commercial buildings can be organized into a governing equation centered on a unit of avoidable loss, called the loss function. However, doing so is not necessarily straightforward. The benefits and costs of ventilation fall upon different stakeholders, some of whom may be far from the building. At the same time, many of the impacts associated with indoor air exposures and environmental externalities are subject to substantial epistemic uncertainty. The approach taken, therefore, was to establish scientific ranges or distributions of impact strengths, and allow an end user—i.e., a building owner, utility bill payer, property manager, business executive, institution, or other decision-making stakeholder—to select parameters to reflect their own preferences. This leaves discretion to the user, and avoids conferring certainty not indicated by the science. The user's preferences transform an outcome into a loss, reflecting what a decision-maker would pay to avoid an outcome. Less loss is better, and the ventilation strategy or rate that minimizes loss is therefore optimal for a given user. These are (optimal) outcome-based ventilation strategies and ventilation rates.

Many potential ventilation outcomes were considered for inclusion, and the rationale for the IAQ-related components included needed to have sound and practical methods to calculate its magnitude, assign it a value, and measure or estimate necessary physical quantities in a real building. For example, the study may not include impacts of exposure to volatile organic compound concentrations, for which there is insufficient information to assign a loss value, and no reliable or cost-effective building-grade option for measuring.

The loss function L, over a given time horizon with a constant electricity price, is $$L = L_{WP} + L_{EA} + L_{PM} + L_{O3} + L_e + L_g \quad (1)$$
$$= P_{WP} \cdot LWP + P_{EA} r_{EA} + P_{PM} C_{exp,PM} + P_{O3} C_{exp,O3} +$$
$$P_e E_e \bigg/ \sum_h + P_e E_e \bigg/ \sum_h$$

The loss terms, which all have units of $/occ/h, associated with the six included outcomes are:

1) $L_{WP} = P_{WP} \cdot L_{WP}$ is loss due to reduced work performance (WP). Lost work performance (LWP, dimensionless) is a function of VR, expressing the performance at a VR relative to the maximum possible performance. Because the strength of the empirically derived VR-WP correlation is uncertain, the function depends on a user-supplied estimate percentile (EP), as explained in Section 2.2. A unit change in LWP is valued at $P_{WP}$, a user-supplied price ($/occ/h), most reasonably taken as an employer's cost of compensation for an hour of employee work.

2) $L_{EA} = P_{EA} r_{EA}$ is loss due to employee excess absence (EA) due to sick leave. The excess absenteeism rate ($r_{EA}$, dimensionless), or the fraction of time workers are absent over and above the minimum possible fraction, is a function of the VR. The function also depends on a user-supplied estimate percentile at which the empirical VR-absenteeism correlation is evaluated. A unit change in $r_{EA}$ is valued at $P_{EA}$, a user-supplied price ($/occ/h), again likely an employer's cost of compensation for an hour of employee work.

3) $L_{PM} = P_{PM} C_{exp,PM}$ is loss due to costs of public health risks associated with exposure to $PM_{2.5}$ at an average concentration of $C_{exp,PM}$ ($\mu g/m^3$). A unit change in $C_{exp,PM}$ is valued at $P_{PM}$ ($/occ/h per $\mu g/m^3$), which is set by a user based on tabulated results derived from evaluating epidemiological risk functions for different estimate percentiles and population characteristics.

4) $L_{O3} = P_{O3} C_{exp,O3}$ is loss due to costs of public health risks associated with exposure to ozone at an average concentration of $C_{exp,O3}$ (ppb). A unit change in $C_{exp,O3}$ is valued at $P_{O3}$ ($/occ/h per ppb), which is set based by a user based on tabulated results of evaluating epidemiological risk functions for different estimate percentiles and population characteristics.

5) $L_e = P_e E_e / \Sigma_h$ is loss due to electricity consumption $E_e$ (kWh), normalized by the total number of occupant-hours in the time horizon $\Sigma_h$ (occ·h) to be on a comparable per-occupant, per-hour basis. The value of a kWh of consumed electricity, $P_e$ ($/kWh), can reflect both electricity utility rates and social costs of externalities associated with electricity generation and transmission. A time-varying version for dynamic electricity prices is presented in the Supplementary Information (SI).

6) $L_g = P_g E_g / \Sigma_h$ is loss due to natural gas consumption $E_g$ (kWh), also normalized by $\Sigma_h$. The value of a kWh of consumed natural gas, $P_g$ ($/kWh), can reflect both natural utility rates and social costs of externalities associated with natural gas extraction, delivery, and combustion.

Together $L_{WP}$ and $L_{EA}$ are the profitable IAQ impacts, or $IAQ_{profit}$, for which a business case can be made directly to revenue-maximizing actors. Together $L_{PM}$ and $L_{O3}$ are the IAQ public health impacts, or $IAQ_{health}$, which will affect workers breathing the indoor air. Together $L_e$ and $L_g$ are the energy consumption costs, both direct and social. (Work performance and sick-leave absenteeism (SBS) have similar associations with ventilation rate but with values two orders of magnitude greater.)

The loss function depends on the values of five physical variables over the time horizon: the average VR, the average concentrations of $PM_{2.5}$ and ozone to which occupants are exposed ($C_{exp,PM}$ and $C_{exp,O3}$), and the electric and natural gas energy consumed ($E_e$ and $E_g$). Well-developed techniques are available for measuring or modeling all five quantities. As for the definition of "average" for the VR and exposed concentrations, some type of occupant-weighted mean is intended. Here, where outcomes are primarily drawn from strategies that produce constant or relatively smooth ventilation over time, we use simple averages during the middle of the workday, but more sophisticated metrics may be appropriate for strategies under which ventilation can vary more sharply.

In addition to the five physical variables (VR, $C_{exp,PM}$, $C_{exp,O3}$, $E_e$, $E_g$), a value is also required for the occupant-hours sum $\Sigma_h$, which is formally the integral of the number of occupants, $N_{occ}$ (occ), present in the control volume (building or zone) evaluated over the time horizon ($t_0$ to $t_f$):

$$\sum_h = \int_{t_0}^{t_f} N_{occ}(t) dt \quad (2)$$

For example, if ten occupants each worked 8 hours during the time horizon, $\Sigma_h$ would be 80 occ·h.

The following subsections describe the rationale behind the individual outcomes included in the loss function in Equation 1, as well as guidance to set values of the user parameters.

2.2 $L_{WP}$: Loss Due to Reduced Work Performance

Figure 1A:
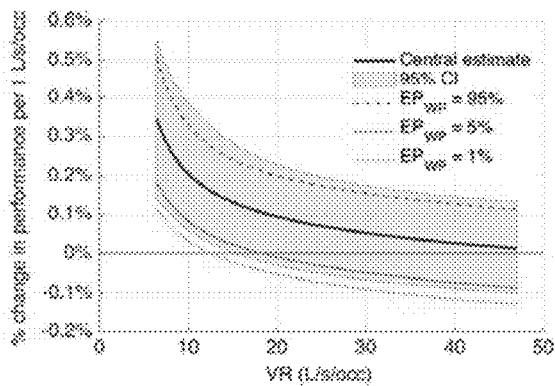
FIG. 1(a) shows relative change in work performance (WP) per each 1 L/s/occ change in ventilation rate (VR), at central estimate, 95% confidence interval (CI), and selected estimate percentiles (EP).

The first outcome is lost work performance (LWP), which varies with VR based on the relation for relative work performance, or the proportional difference in worker productivity achieved at two VRs. The change in work performance per each L/s/occ change in the VR, which is valid from 6.5 to 47 L/s/occ, is shown in FIG. 1a. The dark blue line is the central estimate, and the grey shaded area is the 95% confidence band of the fit. This relation can be expressed as the sum of a deterministic function for the central estimate and another function indicating uncertainty, the latter of which can be fit to 95% confidence limits under an assumption of normal uncertainty distribution.

This approach yields a family of relations parameterized by called the estimate percentile (EP), in this case for work performance ($EP_{WP}$). The user can set their estimate percentile, with a low EP indicating a weak relation (i.e., there is a small chance that the true relation is weaker) and a high EP indicating a strong relation (i.e., a good chance of being stronger than the true relation). FIG. 1a shows the curves for $EP_{WP}=1\%$, $EP_{WP}=5\%$, and $EP_{WP}=95\%$, in addition to the central estimate, or $EP_{WP}=50\%$. An EP value is associated with a standard normal variate, $z_{WP}$, by means of the quantile function (inverse cumulative distribution function or CDF) of the standard normal distribution ($\Phi^{-1}$), $$z_{WP}=\Phi^{-1}(EP_{WP}) \quad (3)$$

Figure 1B:
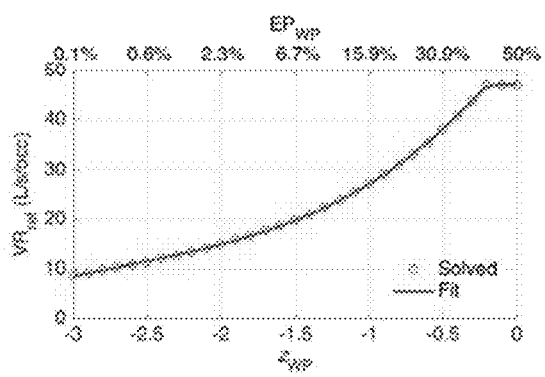
FIG. 1(b) shows reference value $VR_{ref}$ or the VR at which the change in WP is zero, as a function of the EP and the corresponding $z_{WP}$ value.

Cumulative lost performance may be judged relative to a reference ventilation rate, $VR_{ref}$, at which work performance is maximized. If $EP_{WP}>50\%$, then the $VR_{ref}=47$ L/s/occ, which is the upper limit for the fit above. For $EP_{WP}<50\%$, the maximum possible work performance may be obtained where the resulting curve equals zero. FIG. 1b shows the value of $VR_{ref}$ obtained by solving to find the zeros for multiple $z_{WP}$ values. A fit to those results ($R^2=1.00$) allows $VR_{ref}$ to be calculated directly as:

$$VR_{ref}=\min(53.60+36.41z_{WP}+11.30z_{WP}^2+1.39z_{WP}^3,47) \quad (4)$$

The work performance at a given VR relative to that at $VR_{ref}$ is determined by integrating the curves for change per L/s/occ from FIG. 1a from VR to $VR_{ref}$. Calling that indefinite integral $g(\cdot)$ and recognizing that lost work performance is unity minus that relative difference, $$LWP=1-\exp(g(VR')-g(VR_{ref})) \quad (5)$$

where $VR'=\min(\max(VR, 6.5), VR_{ref})$ L/s/occ limits VR to a valid range. The function $g(\cdot)$ can be written as the sum of a deterministic central tendency and uncertainty offset determined by $z_{WP}$, $$g(x)=f(x)+z_{WP}\cdot h(x) \quad (6)$$

where $$f(x)=(-76.38x^{-1}-0.78x\cdot\ln x+3.87x)/1000 \quad (7)$$

which was provided in earlier work and $$h(x)=(-11.617x^{-1.276}+0.607x)/1000 \quad (8)$$

Figure 2:
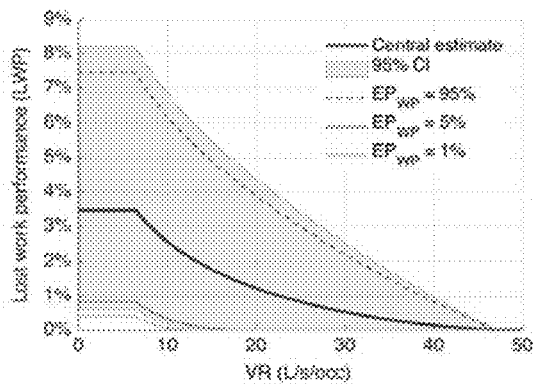
FIG. 2 shows lost work performance as a function of total ventilation rate (VR), at central estimate, 95% confidence interval (CI), and selected estimate percentiles (EP).

The final relation between VR and LWP, the result of applying Equations (3) through (8), is shown in FIG. 2 for selected $EP_{WP}$ values. For VR above $VR_{ref}$ or below 6.5 L/s/occ, LWP is held at the limit value. To determine the loss for the work performance outcome, the dimensionless LWP is multiplied by $P_{WP}$ ($/occ/h). This is most likely an employer's cost for an hour of productive employee time. Some guidance about compensation rates for office workers is given in Section 2.6.

2.3 $L_{EA}$: Loss Due to Excess Employee Absence

A second outcome is excess absence (EA) due to illness. The relative risk (RR) of sick leave absence at a low VR (estimated as 12 L/s/occ) may be compared to a higher VR (~24 L/s/occ). When this is done, the central and 95% CI estimates for RR may be used to generate an uncertainty distribution. As with LWP, a user can set the relationship strength within this distribution by selecting an estimate percentile, in this case $EP_{EA}$. By using the inverse CDF, as in Equation (3), $EP_{EA}$ can be associated with a standard normal variate $z_{EA}$, and then the relative risk can be calculated as:

$$RR_{abs}=\exp(0.116z_{EA})\cdot 1.53 \quad (9)$$

To extrapolate to a continuous function, an exponential relative risk model was adopted, and took as fixed a 2% base absence rate at 12 L/s/occ, limiting the domain to 5-30 L/s/occ, and defining VR"=min(max(VR,5),30) L/s/occ.

Figure 3:
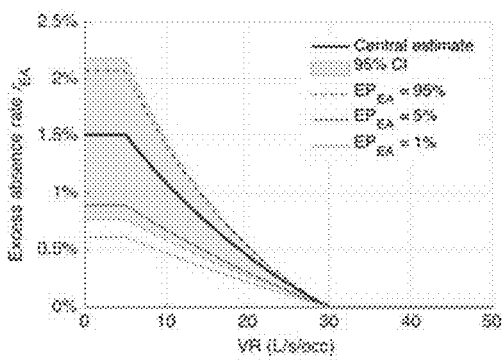

The excess absence rate $r_{EA}$ (dimensionless, or hours absent per hour worked) is then:

$$r_{EA}=0.02\cdot(RR_{abs}^{(1-VR''/12)}-RR_{abs}^{-1.5}) \quad (10)$$

where the first term is the actual absence rate and the second is the minimum possible absence rate at 30 L/s/occ. FIG. 3 illustrates Equation (10) for the central estimate ($EP_{EA}=50\%$) and the 95% confidence band about it, as well as for the relation with $EP_{EA}=1\%$, $EP_{EA}=5\%$, and $EP_{EA}=95\%$. The loss per hour due to an absent employee is the outcome $r_{EA}$ multiplied by $P_{EA}$ ($/occ/h), likely total hourly employee compensation.

2.4 $L_{PM}$ and $L_{O3}$: Losses Due Public Health Risks of $PM_{2.5}$ and Ozone Exposure Indoor air quality also impacts occupant health in ways that do not figure into the business interests of a decision-maker like a business owner or office manager. Because these impacts are incremental, or modify a small base risk, it makes sense to think of them in the aggregate as public health costs. Many such risks with indoor pollutant exposure have been identified, but nearly all present insurmountable challenges in terms of real-time estimation or of impact quantification.

However, two species introduced from outdoors pass both tests: particulate matter with aerodynamic diameter <2.5 μg ($PM_{2.5}$) and ozone ($O_3$). Multiple large-population studies have established health impacts associated with outdoor concentrations, and a significant amount of exposure to outdoor pollutants occurs indoors. Following the lead of others, for an individual, the change in annual incidence risk $\Delta y_{ij}$ of a health endpoint j due to a change in average concentration $\Delta C_i$ of pollutant i ($PM_{2.5}$ or ozone) can be modeled with a concentration-response (C-R) function as:

$$\Delta y_{ij}=y_{0,j}(e^{\beta_{ij}\Delta C_i f_t}-1) \quad (11)$$

where $\beta_{ij}$ is the response coefficient for endpoint j to pollutant i, and $y_{0,j}$ is the population baseline incidence of the endpoint (occ$^{-1}$ year$^{-1}$). The variable $f_t$ is the duration of the exposure expressed as a fraction of a year. The coefficient $\beta_{ij}$ has units of $(\mu m/m^3)^{-1}$ for $PM_{2.5}$ and $(ppb)^{-1}$ for $O_3$, and can be derived from RR exposure estimates from epidemiological studies, while the baseline incidences can be determined from broader population health statistics (e.g., from the U.S. Centers for Disease Control). Each endpoint can be assigned a monetary value $M_j$, allowing calculation of the expected costs of risk changes.

There were eight health endpoints for $PM_{2.5}$ and seven for ozone. Table 1 lists RR values for the endpoints and baseline prevalence $y_{0,j}$ for non-mortality endpoints. Table 2 gives baseline mortality prevalence for selected populations. Table 3 lists endpoints' monetary values $M_j$.

TABLE 1

Concentration-response (C-R) function parameters and baseline incidence for health endpoints associated with $PM_{2.5}$ and ozone. Relative risk (RR) values are per concentration change of 10 $\mu g/m^3$ for $PM_{2.5}$ or 10 ppb for ozone.

| Endpoint | Effect estimates RR (95% CI) | Source | RR lognormal distribution GM | GSD | Baseline incidence, $y_{0,j}$ per 100,000 | Source |
|---|---|---|---|---|---|---|
| $PM_{2.5}$ endpoints (RR per 10 $\mu g/m^3$) | | | | | | |
| Mortality, all-cause | 1.06 (1.02-1.11) | Pope et al., 2002 [24] | 1.0600 | 1.0218 | | ------ See Table 2 ------ |
| Mortality, all-cause | 1.16 (1.07-1.26) | Laden et al., 2006 [41] | 1.1600 | 1.0426 | | |
| Chronic bronchitis | 2.48 (2.18-3.00) | Dutton et al., 2013 [22] | 2.4843 | 1.0851 | 40 | Dutton et al., 2013 [22] |
| Coronary revascularization | 1.20 (1.00-1.43) | Miller et al., 2007[1] [45] | 1.2000 | 1.0955 | 1268 | U.S. CDC, 2010 [47] |
| Non-fatal stroke | 1.28 (1.02-1.62) | Miller et al., 2007[1] [45] | 1.2840 | 1.1245 | 1244 | Mozaffarian et al., 2015[2] [48] |
| Hospital admission, respiratory | 1.04 (1.02-1.05) | Burnett et al., 1997 [46] | 1.0363 | 1.0080 | 367 | Burnett et al., 1997[3] [46] |
| Hospital admission, cardiac | 1.02 (1.00-1.05) | Burnett et al., 1997 [46] | 1.0227 | 1.0131 | 659 | Burnett et al., 1997[3] [46] |
| Minor restricted activity days | 1.08 (1.06-1.09) | Dutton et al., 2013 [22] | 1.0768 | 1.0072 | 2140 | Dutton et al., 2013 [22] |
| Asthma attack | 1.01 (1.00-1.03) | Dutton et al., 2013 [22] | 1.0141 | 1.0056 | 2700 | Dutton et al., 2013 [22] |
| Ozone endpoints (RR per 10 ppb) | | | | | | |
| Mortality, short-term | 1.00 (1.00-1.01) | Smith et al., 2009 [44]; Zanobetti and Schwartz, 2008 [43] | 1.0049 | 1.0012 | | ------ See Table 2 ------ |
| Mortality, respiratory | 1.03 (1.01-1.05) | Jerrett et al., 2009 [42] | 1.0290 | 1.0095 | | |
| Chronic asthma | 1.32 (1.01-1.72) | Dutton et al., 2013 [22] | 1.3231 | 1.1442 | 219 | Dutton et al., 2013 [22] |
| Hospital admission, respiratory | 1.06 (1.04-1.08) | Burnett et al., 1997 [46] | 1.0589 | 1.0093 | 367 | Burnett et al., 1997[3] [46] |
| Hospital admission, cardiac | 1.05 (1.02-1.08) | Burnett et al., 1997 [46] | 1.0494 | 1.0138 | 659 | Burnett et al., 1997[3] [46] |
| Minor restricted activity days | 1.02 (1.01-1.04) | Dutton et al., 2013 [22] | 1.0222 | 1.0066 | 2140 | Dutton et al., 2013 [22] |
| Asthma attack | 1.02 (1.00-1.03) | Dutton et al., 2013 [22] | 1.0182 | 1.0071 | 2700 | Dutton et al., 2013 [22] |

General note:
All values cited from Dutton et al. (2013) were used without modification; see that reference for the original study sources.
[1]The Women's Health Initiative (Miller et al., 2007) estimated hazard ratios for 58,610 women, which have been used here as relative risk estimates regardless of sex.
[2]Average prevalence for all sexes and races, for ages 20 to 59.
[3]Hospital admission baseline incidence estimated from total prevalence in study population divided by the study population.

Some of the most important changes were to the baseline incidence of mortality, by far the highest-valued endpoint. Using total population mortality rates, as some previous studies have done, is appropriate for residential assessments but overstates impacts in offices, because non-working populations have higher death rates. Thus justed all baseline mortality rates may be adjusted to reflect averages for ages 25-64. In addition, death rates differ substantially by educational attainment and finer age gradations (Table 2). Costs were calculated for some of these subgroups to enable more targeted loss valuation.

TABLE 2

Death rates per 100,000 for U.S. residents and selected groups.

| | Deaths rate, per 100,000 | | | | |
|---|---|---|---|---|---|
| | Age 25-34 | Age 35-44 | Age 45-54 | Age 55-64 | Average[3] |
| All-cause mortality[1] | | | | | |
| All education levels | 107 | 172 | 408 | 862 | 332 |
| High school or less | 190 | 286 | 638 | 1271 | 518 |
| Some college or greater | 57 | 99 | 228 | 541 | 196 |
| Respiratory mortality[2] | 1 | 3 | 14 | 51 | 17 |

All data from U.S. CDC National Vital Statistics Reports, Vol. 64 No. 2, February 2016.
[1]For total mortality, the values from two sets of states were averaged, weighted by the sets' populations. Death rates for high school and less than high school, which were very similar, were also averaged, weighted by each group's proportion of total deaths.
[2]Not including deaths from influenza and pneumonia, pneumoconioses and chemical effects, or pneumonitis due to solids and liquids.
[3]For ages 25-64. For total mortality, the age-adjusted figure provided by CDC was used. For respiratory causes, it is the population-weighted average of the four age bins.

TABLE 3

Monetary values of public health IAQ endpoints.

| Endpoint | $M_j$ (2016$) | Source |
|---|---|---|
| Mortality | $8,920,800 | Dutton et al., 2013 [22] |
| Chronic bronchitis | $479,058 | Dutton et al., 2013 [22] |
| Coronary revascularization | $101,847 | Stroupe et al., 2006 [49] |
| Chronic asthma | $54,798 | Dutton et al., 2013 [22] |
| Non-fatal stroke | $21,416 | Wang et al., 2014 [50] |
| Hospital admission[1] | $9,050 | AHRQ, 2016 [51] |
| Minor restricted activity days | $71 | Dutton et al., 2013 [22] |
| Asthma attack | $45 | Dutton et al., 2013 [22] |

General note:
All values cited from Dutton et al. (2013) [22] were used without modification; see that reference for the original sources.
[1]Hospital admission for general medical treatment, excluding mental health, childbirth and neonatal treatment, and admissions for surgery.

Combining the costs of all endpoints associated with a concentration change $\Delta C_i$ of a pollutant, sustained over a fraction of the year $f_t$, results in:

$$(\Delta \text{risk costs})_i = \Sigma_j M_j y_{0,j}(e^{\beta_{ij}\Delta C_i f_t} - 1) \approx \Sigma_j M_j y_{0,j} \beta_{ij} \Delta C_i f_t \quad (12)$$

where the simplification holds because $e^a - 1 \approx a$ for very small a. Testing with sampling from the distributions of $\beta_{ij}$ indicated that the error introduced by linearization was negligible when $f_t$ represented a day, and almost never greater than 5% even when $f_t$ represented a full work year of consistently very large concentration changes.

Hourly risk costs are evaluated by setting $f_t$ to 1/8760. A price may be defined as:

$$P_i = \Sigma_j M_j y_{0,j} \beta_{ij}/8760 \quad (13)$$

that indicates the value (in $, often expressed ¢) of a one unit change in indoor concentration ($\mu g/m^3$ or ppb) for one occupant for one hour. The distributions of $P_i$ values may be calculated using a Monte Carlo sample from the $\beta_{ij}$ distributions listed in Table 1, and other parameters Table 2 and Table 3. For $PM_{2.5}$ mortality and selecting with equal probability from studies' RR estimate distributions, results indicated that, for both $PM_{2.5}$ and ozone, total mortality was by far the largest contributor due to its high monetary value. There were additional moderate contributions from chronic bronchitis and coronary revascularization for $PM_{2.5}$ (4-21%, depending on the subgroup's death rate) and chronic asthma for ozone (11-41%, depending on subgroup). No other endpoint contributed more than 6% in any group.

FIG. 4 shows inverted CDF plots of the $P_{PM}$ and $P_{O3}$ results against the estimate percentiles (EP), and Table 4 gives some specific numerical results. For the 'All' group, death rates for all people aged 25-64 were used, while 'HS or less' and 'College' divided the working age population by education level (where HS stands for high school), and 'College, young' used death rates for college-educated 25-44 year-olds. Because of the dominant influence of mortality risk, the prices for the young college-educated population were extremely low, while those for the general non-college-educated population were 3 to 5 times greater. For $PM_{2.5}$, the two distinct regions results represent RR below and above the 50th percentile.

valued at prices $P_e$ and $P_g$ ($/kWh, often expressed in ¢/kWh). The prices can include standard utility rates as well as social costs, if desired. For a static electricity price, the losses are simply the price times the usage, normalized by the number of occupant hours $\Sigma_h$:

$$L_e = P_e E_e / \Sigma_h \text{(for constant } P_e) \tag{15a}$$

$$L_g = P_g E_g / E_h \tag{15b}$$

The energy consumption prices $P_e$ and $P_g$ can have two contributors: utility rates and social costs. The first two columns of Table 5 show the median of annual average commercial utility rates for grid electricity and for purchased natural gas from 2005 to 2015, broken down by U.S. state. A majority of states had median commercial electricity prices of 8.4-11.7 ¢/kWh, and all states except Hawaii were 6.9-17.3 ¢/kWh. For natural gas, the majority of states' commercial prices were 2.9-3.8 ¢/kWh, and all except Hawaii were $2.5-5.4 ¢/kWh. (For both sources, prices were also relatively stable over time during 2005 to 2015, only very rarely deviating from the medians by more than 2 ¢/kWh.)

TABLE 4

Prices $P_{PM}$ and $P_{O3}$ for unit, hour-long, per-occupant changes in concentration. Prices are shown in cents. $PM_{2.5}$ prices are for the blended sample including both American Cancer Society and Harvard Six Cities relative risk distributions.

| | $PM_{2.5}$ and ozone prices for selected estimate percentiles (EP) | | | | | | | | |
|---|---|---|---|---|---|---|---|---|---|
| | 1 | 2.5 | 5 | 25 | 50 | 75 | 95 | 97.5 | 99 |
| $P_{PM}$ (¢/occ/h/($\mu g/m^3$)) | | | | | | | | | |
| All | 1.0 | 1.3 | 1.6 | 2.5 | 3.6 | 5.6 | 7.4 | 7.9 | 8.5 |
| High school or less | 1.3 | 1.7 | 2.1 | 3.6 | 5.2 | 8.4 | 11.2 | 12.0 | 12.9 |
| Some college or more | 0.8 | 1.0 | 1.1 | 1.7 | 2.3 | 3.5 | 4.6 | 4.9 | 5.2 |
| College, and young | 0.6 | 0.6 | 0.7 | 1.0 | 1.3 | 1.7 | 2.2 | 2.3 | 2.5 |
| $P_{O3}$ (¢/occ/h/pph) | | | | | | | | | |
| All | 0.1 | 0.2 | 0.2 | 0.2 | 0.3 | 0.3. | 0.3 | 0.4 | 0.4 |
| High school or less | 0.2 | 0.2 | 0.2 | 0.3 | 0.4 | 0.4 | 0.5 | 0.5 | 0.5 |
| Some college or more | 0.1 | 0.1 | 0.1 | 0.2 | 0.2 | 0.2 | 0.2 | 0.3 | 0.3 |
| College, and young | 0.0 | 0.0 | 0.1 | 0.1 | 0.1 | 0.1 | 0.1 | 0.1 | 0.1 |

Subpopulation variations based only on differences in mortality rates.
'All' includes ages 25-64 and 'young' includes ages 25-44.

To assess loss in comparison to a complete absence of the pollutant, the relevant concentration change $\Delta C_i$ is just the concentration $C_i$. Therefore the instantaneous risk cost is $P_i C_i(t)$, and loss is determined by multiplying this expression by the number of occupants present, integrating over the time horizon, and then normalizing on a per-occupant, per-hour basis, as in:

$$L_i = \frac{\int_{t_0}^{t_f} N_{occ}(t) P_i C_i(t) dt}{\sum_h} = P_i \frac{\int_{t_0}^{t_f} N_{occ}(t) C_i(t) dt}{\sum_h} = P_i C_{exp,i} \tag{14}$$

where the implicitly defined quantity $C_{exp,i}$ is simply the occupant-weighted average concentration of pollutant i to which occupants are exposed during time horizon, expressed in the units of pollutant i.

2.5 $L_e$ and $L_g$: Losses Due to Electricity and Natural Gas Consumption

The final two outcomes are electricity and natural gas consumption, respectively denoted $E_e$ and $E_g$ (kWh) and There are many social costs, or health and environmental costs not reflected in market prices, of energy extraction, production, and distribution. For electricity, the largest social cost is often due to public health impacts of exposure to air pollution generated from coal-fired (and to a lesser extent, oil and natural gas) power plants. Estimates of these costs, based on power plant emissions, atmospheric chemistry and transport, and public health modeling, are shown for each U.S. state in the third column in Table 5.

TABLE 5

Reference prices by U.S. state for components of $P_e$ and $P_g$. Utility rates are medians of annual averages from 2005 to 2015. The health costs are for combustion-related public health impacts for grid electricity (Machol and Rizk, [54]).

| | Natural Gas utility rate (¢/kWh) | Electric grid utility rate (¢/kWh) | Electrid grid, combustion health costs (¢/kWh) |
|---|---|---|---|
| U.S. | 3.3 | 10.9 | 24.5 |
| Alabama | 4.6 | 10.8 | 32 |

TABLE 5-continued

Reference prices by U.S. state for components of $P_e$ and $P_g$. Utility rates are medians of annual averages from 2005 to 2015. The health costs are for combustion-related public health impacts for grid electricity (Machol and Rizk, [54]).

| | Natural Gas utility rate (¢/kWh) | Electric grid utility rate (¢/kWh) | Electrid grid, combustion health costs (¢/kWh) |
|---|---|---|---|
| Alaska | 2.8 | 15.3 | — |
| Arizona | 3.7 | 9.9 | 10 |
| Arkansas | 3.4 | 8.0 | 17 |
| California | 2.9 | 14.5 | 7 |
| Colorado | 2.8 | 9.6 | 12 |
| Connecticut | 3.6 | 16.5 | 4 |
| Delaware | 5.0 | 11.6 | 42 |
| District of Columbia | 4.4 | 13.4 | — |
| Florida | 3.8 | 10.5 | 20 |
| Georgia | 4.0 | 9.9 | 33 |
| Hawaii | 13.3 | 30.4 | — |
| Idaho | 2.9 | 6.9 | — |
| Illinois | 3.4 | 9.4 | 25 |
| Indiana | 3.0 | 9.1 | 36 |
| Iowa | 2.8 | 8.4 | 27 |
| Kansas | 3.7 | 8.8 | 17 |
| Kentucky | 3.5 | 8.5 | 28 |
| Louisiana | 3.4 | 9.2 | 14 |
| Maine | 4.4 | 13.3 | 3 |
| Maryland | 3.7 | 12.2 | 71 |
| Massachusetts | 4.1 | 15.4 | 15 |
| Michigan | 3.3 | 10.4 | 31 |
| Minnesota | 2.7 | 8.9 | 13 |
| Mississippi | 2.9 | 10.3 | 14 |
| Missouri | 3.9 | 7.9 | 26 |
| Montana | 3.2 | 9.3 | 15 |
| Nebraska | 2.5 | 8.2 | 26 |
| Nevada | 3.3 | 10.9 | 5 |
| New Hampshire | 4.8 | 15.1 | 42 |
| New Jersey | 3.4 | 13.9 | 19 |
| New Mexico | 2.7 | 9.5 | 12 |
| New York | 3.5 | 17.3 | 11 |
| North Carolina | 3.6 | 8.7 | 23 |
| North Dakota | 2.6 | 7.7 | 41 |
| Ohio | 3.3 | 9.9 | 48 |
| Oklahoma | 4.4 | 8.1 | 13 |
| Oregon | 3.5 | 8.3 | 6 |
| Pennsylvania | 3.8 | 10.4 | 50 |
| Rhode Island | 5.4 | 14.4 | — |
| South Carolina | 3.5 | 9.7 | 30 |
| South Dakota | 2.6 | 8.0 | 34 |
| Tennessee | 3.4 | 10.3 | 27 |
| Texas | 2.8 | 10.3 | 15 |
| Utah | 2.6 | 7.7 | 11 |
| Vermont | 4.4 | 14.4 | — |
| Virginia | 3.4 | 8.1 | 31 |
| Washington | 3.8 | 7.8 | 10 |
| West Virginia | 3.7 | 7.7 | 20 |
| Wisconsin | 2.9 | 10.7 | 29 |
| Wyoming | 2.7 | 8.1 | 21 |

Note:
The California $PM_{2.5}$ combustion-related health social cost reflects externalities incurred in other states due to imported electricity.

Other researchers have come up with lower combustion-related health cost estimates using different assumptions and models and Table 6 (shown in FIG. 15) lists some of these. Table 6 also lists prices reflecting perhaps the best-known social cost, the social cost of carbon (SC-CO2), based on a variety of estimates and CO2 emission factors for electricity generation. Summing the literature estimates of the various social costs yields a range 4.8-53.6 ¢/kWh, for the U.S. average. Excluding combustion-related public health impacts, which can be added for a particular state from Table 5, U.S. average social cost totals are 3.2-18.6 ¢/kWh.

For natural gas directly combusted on-site for heating, only climate change externalities were included, in the absence of any peer-reviewed quantification of the costs for the many local externalities of natural gas extraction and distribution. For heating natural gas, cost estimates were made for multiple $SC-CO_2$ values, for multiple methane leakage rates, and for two time horizons. Methane leakage can influence the climate impact of natural gas substantially, depending on the loss rate, for which a wide range of estimates exist, and the time horizon for radiative forcing considered.

2.6 Reference Values for User Parameters in the Loss Equation

To explore the influence of user preferences on loss magnitudes and outcome-based ventilation, establishing low, medium, and higher reference values for user parameters (Table 7).

TABLE 7

Low, medium, and high reference values for user-defined parameters in the loss function. The $P_{PM}$ and $P_{O3}$ values correspond to respective $EP_{PM}$ and $EP_{O3}$ values for all office occupants ages 25-64.

| User parameter | Unit | Low value | Medium value | High value |
|---|---|---|---|---|
| $EP_{WP}$, $EP_{EA}$, $EP_{PM}$, $EP_{O3}$ | % | 5 | 50 | 95 |
| $P_{WP}$, $P_{EA}$ | $/occ/h | 27 | 46 | 86 |
| $P_{PM}$ | ¢/(μg/m³)/occ/h | 1.56 | 3.57 | 7.38 |
| $P_{O3}$ | ¢/ppb/occ/h | 0.18 | 0.26 | 0.34 |
| $P_e$ | ¢/kWh | 6.9 | 14.7 | 79.0 |
| $P_g$ | ¢/kWh | 2.5 | 3.7 | 15.8 |

For the strength of work performance and excess absenteeism relations, low, medium, and high parameters used the 5th, 50th, and 95th estimate percentiles. The low, medium, and high values for $P_{PM}$ and $P_{O3}$ were also based on 5th, 50th, and 95th EP values, respectively, in all cases for the 'All' (ages 25-64) death rates results seen in FIG. 4 and Table 4. For the values of $P_{WP}$ and $P_{EA}$, data on compensation were compiled for office workers in various fields from the U.S. Bureau of Labor Statistics (BLS). The reference values for $P_{WP}$ and $P_{EA}$ were based on total compensation (i.e., including benefits) per hour, with the low value corresponding to office and administrative support occupants, the medium value to the weighted average for all office workers, and the high value to management occupations.

For $P_e$ the low value is the lowest state utility rate (Idaho) from Table 5. The medium value is the median state utility rate (9.9 ¢/kWh) plus the lowest possible "Sum of non-overlapping social costs" for U.S. electricity generation from Table 6 (4.8 ¢/kWh). The high value is the utility rate (10.4 ¢/kWh) plus public health cost of combustion for electricity generation (50.0 ¢/kWh) for the state with the second highest sum of those values (Pennsylvania), plus the highest estimate for the sum of all externalities except combustion-related health impacts from Table 6 (18.6 ¢/kWh).

For $P_g$ the low value is the lowest state utility rate (Nebraska). The medium value is the median state utility rate (3.4 ¢/kWh) plus a small climate change externality (0.3 ¢/kWh) based on the lowest possible $SC-CO_2$ value with 1% methane leakage and a 100-year time-horizon. The high value is the utility rate (5.4 ¢/kWh) in the second most expensive state (Rhode Island) plus a climate change externality (10.4 ¢/kWh) based on the highest possible $SC-CO_2$ value with 5% methane leakage and a 20-year time-horizon.

2.7 Offset Sector Dataset

Two office building prototypes were used to explore the magnitude of the loss function over a previous dataset of energy simulation results. The 'small-CAV' office was single story and small (325 m$^2$), with a single zone served by a packaged constant air volume (CAV) HVAC system with a single-speed direct expansion (DX) cooling coil and a gas-fired heating coil. The 'medium-VAV' office was medium-sized (4,982 m$^2$) with three stories, each with one core and four perimeter zones. Each floor had a variable air volume (VAV) HVAC system with a two-speed DX cooling coil, and each zone had terminal units with hot water reheat. Simulations were conducted with EnergyPlus, a physics-based, validated (e.g., to ASHRAE Standard 140-2011) modeling environment. The office types were derived from existing EnergyPlus reference models but underwent some modifications.

The office types were simulated in a Monte Carlo analysis (5000 instances each), varying climates, outdoor pollution trajectories, and 19 building parameters. The instances according to location were sampled to match the geographical and climatological distribution of U.S. offices. For the results discussed herein, the sampling was done to achieve a dataset that was 75.9% small offices and 24.1% medium ones, matching the distribution for number of office types in the U.S. The final sampled datasets, which are a good statistical representation of the U.S. small-to-medium-large office stock, had 5000 instances for annual results, with 1,260,000 instances for day-resolved values.

Every instance was simulated with multiple ventilation strategies. The strategies included herein are: (i) a baseline with a fixed mechanical ventilation rate of 9.4 L/s per occupant (20 ft$^3$/min/occ), which is the minimum rate specified by ASHRAE Standard 62-2001[89]; (ii) doubled mechanical ventilation, or 2×VR; (iii) differential enthalpy economizing with the baseline VR as the minimum, or Econ; and (iv) demand-controlled ventilation (DCV), in which enough outdoor air was provided to avoid exceeding 950 ppm of $CO_2$ in the critical (highest $CO_2$ concentration) zone.

FIG. 5 demonstrates histograms of results of five key simulation outputs over the dataset, for the four ventilation strategies used in this work. These are day-resolved values, and are averages during primary occupied hours of 8 a.m. to 6 p.m. The VR, here and in all that follows, refers to the total outdoor air rate, including the sum of mechanical ventilation and infiltration divided by average number of occupants. That is why even ventilation strategies like ASHRAE 62-2001 and 2×VR, in which the mechanically-provided OA was fixed, had substantial variability. At a glance, FIG. 5 gives a sense of typical results and of the extent to which ventilation strategy changes affected outcomes.

3. Results and Discussion
3.1 Outcome Loss Magnitudes

FIG. 6a shows the range of magnitude of losses for each outcome for the low, medium, and high reference values from Table 7, for the baseline ASHRAE 62-2001 ventilation strategy. It is immediately clear that the profitable IAQ outcomes generated much greater losses than did IAQ public health or energy ones. With medium parameter values, median ASHRAE 62-2001 losses for work performance and excess absence were 0.69 and 0.28 $/occ/h, respectively, while $PM_{2.5}$ and ozone losses were 0.12 and 0.02 $/occ/h, respectively, and electricity and natural gas losses were 0.04 and 0.00 $/occ/h, respectively. With high reference parameters, the contrast was even starker, with performance and absence losses rising to 3.81 and 0.63 $/occ/h, respectively, while no other component exceeded 0.24 $/occ/h.

The much greater value of profitable IAQ impacts compared to energy ones is not a surprise, given the 1.5-2 order of magnitude difference already observed for the office sector. The relative magnitude of public health impacts was smaller than has previously been suggested. That difference is because of a focus on the working-age population that occupies offices, which have a lower mortality rate; the relative magnitude was similar in another study on offices.

Ultimately, the difference in losses produced by available strategies, not the absolute magnitude of losses themselves, drives outcome-based ventilation. FIG. 6b shows the outcome loss changes when switching from the ASHRAE 62-2001 minimum rate to 2×VR, which equates to adding ~10 L/s/occ to the VR. The median loss changes, with medium-valued parameters, were −0.36 ($L_{WP}$), −0.21 ($L_{EA}$), 0.02 ($L_{PM}$), 0.01 ($L_{O3}$), 0.00 ($L_e$), and 0.00 ($L_g$) $/occ/h. As expected, increasing ventilation always reduced losses related to productivity and sick leave, nearly always increased public health and natural gas consumption losses, and usually increased electricity consumption loss. Given this fact and the difference of component magnitudes, user parameters sets would normally lead to a decision to increase ventilation.

In fact, the set of parameters under which the profitable benefits of increasing ventilation would be meaningfully opposed by the deleterious impacts on public health and energy is one in which $IAQ_{profit}$ parameters are quite low while $IAQ_{health}$ or energy parameters, or both, are quite high. FIG. 7 illustrates this fact with an enlargement of the 0-0.50 $/occ/h range, and $IAQ_{profit}$ differences negated for graphical comparison. With low-level parameters, the median $IAQ_{profit}$ was −0.09 $/occ/h. With high-level parameters, the medians were 0.05, 0.01, 0.07 $/occ/h for $IAQ_{health}$, Energy, and their sum, respectively.

To further illustrate the dominance of $IAQ_{profit}$ outcomes, consider the ratio of loss changes in $IAQ_{profit}$ to loss changes in the other two categories, again when adding ~10 L/s/occ to the ASHRAE 62-2001 minimum VR. $IAQ_{profit}$ and $IAQ_{health}$ were always in conflict, and $IAQ_{profit}$ and Energy were in conflict (i.e., no free cooling) 72% of the time. In these tradeoff situations, when the initial VR was 15 L/s/occ or less and using all medium parameters, the reduced $IAQ_{profit}$ loss was, at the median, 22 times as large as the added $IAQ_{health}$ loss, and 150 times as large as the added Energy loss. Even with the most ventilation-averse settings—with low $IAQ_{profit}$ parameters and high $IAQ_{health}$ and energy parameters—the median reduction in $IAQ_{profit}$ loss was twice the added $IAQ_{health}$ loss and five times the added energy loss.

3.2 Decisive Outcomes and Categories

In the following two sections, the analysis expands beyond the outcome losses for ASHRAE 62-2001 and 2×VR, and the differences between them, to the implications for decision-making when considering all four ventilation strategies: ASHRAE 62-2001, 2×VR, Econ, and DCV. Two sets of user preferences are employed for illustration. 'Medium Parameters' simply uses the medium reference values from Table 7 for all user parameters. 'Public & Planet' is the ventilation-averse parameter set just described: low reference values for profitable IAQ parameters ($EP_{WP}$, $EP_{WP}$, $P_{WP}$, $P_{EA}$), and high reference values for parameters related to IAQ public health ($P_{PM}$, $P_{O3}$) and energy ($P_e$, $P_g$). Since the influence of $IAQ_{profit}$ is so decisive, any parameter set other than 'Public & Planet' would lead to nearly the same decisions as 'Medium Parameters.'

First, the analysis examines which components were most influential on outcome-based ventilation. FIG. 8 shows the percentage of occurrences where removing a particular outcome or category changed the outcome-based VR (among the options produced by the four existing strategies) by at least 1 L/s/occ. With Medium Parameters, the $IAQ_{profit}$ category was truly decisive. As long as either $L_{WP}$ or $L_{EA}$ was present, the decision usually remained the same: use the strategy with the highest VR. If both $L_{WP}$ and $L_{EA}$ were removed, the outcome-based VR nearly always changed. For Public & Planet, the tradeoffs were more complex. All outcomes were sometimes influential on their own at least 10% of the time, and $L_{WP}$, $L_{EA}$, and $L_{PM}$ changed the decision at least 25% of the time. Removing any of the three categories changed the decision at least one-third of the time.

3.3 Outcome-Based VRs and Parameter Sensitivity

To examine outcome-based VRs, daily VRs were compiled resulting from the four strategies, screening the set to only include the 580,013 days where there was at least one VR less than 15 L/s/occ, one between 15 and 25 L/s/occ, and one above 25 L/s/occ. For each day, the VR that produced the lowest loss was recorded. Summary statistics and bin membership (Table 8) broadly indicated the magnitude of outcome-based VRs, even if they are not quite optimal outcome-based VRs (since the strategies did not intentionally minimize loss). The results indicated much greater ventilation than the 8.5 L/s/occ minimum prescribed by ASHRAE 62.1-2016 for a typical office space, with medians near 30 L/s/occ for both illustrative user profiles. With Medium Parameters, there were literally no conditions or building features that drove the outcome-based VR lower than 25 L/s/occ. Even for Public & Planet, 57% of days had a VR>25 L/s/occ, and only 17% had a VR<15 L/s/occ.

TABLE 8

Summary statistics and membership in one of three bins for outcome-based VRs over the office dataset.

| | | | Percent of instances in VR bin | | |
|---|---|---|---|---|---|
| | VR (L/s/occ) | | <15 | 15-25 | >25 |
| | Median | Mean | L/s/occ | L/s/occ | L/s/occ |
| Medium Parameters | 32.5 | 43.1 | 0% | 0% | 100% |
| Public & Planet | 26.4 | 29.0 | 17% | 25% | 57% |

While all days ended up in the highest VR bin with Medium Parameters, building characteristics and weather conditions did affect the outcome-based VR with the Public & Planet profile. Using a multinomial regression to rank these factors revealed three as critical: outdoor $PM_{2.5}$ concentration, $PM_{2.5}$ filter efficiency, and outdoor temperature. FIGS. 9a and 9b illustrate the influence of these parameters on Public & Planet decisions. FIG. 9a shows the influence of the outdoor $PM_{2.5}$ concentration and $PM_{2.5}$ filter efficiency $\eta_{PM,mv}$ (single pass in the mechanical ventilation airstream). When the outdoor $PM_{2.5}$ concentration was below 8 μg/m³, regardless of filter efficiency, the lowest-loss VR was usually >25 L/s/occ (76% of the time). But when outdoor $PM_{2.5}$ was above 15 μg/m³ and filter efficiency was less than 40%, the lowest-loss VR was nearly always <15 L/s/occ (82% of the time). FIG. 9b shows bin membership by outdoor $PM_{2.5}$ concentration and outdoor temperature $T_{out}$. When $T_{out}$ was between about 10 and 30° C. and outdoor $PM_{2.5}$ less than about 10 μg/m³, even the Public & Planet decision-maker nearly always selected strategies with VR>25 L/s/occ (84% of the time). Only when outdoor temperatures were more extreme or outdoor PM concentration elevated were lower VRs selected.

3.4 Deciding Among Existing Strategies

When presented with a question of using outcomes to select the best long-term strategy—over the entire year, rather than for a single day—from the options of ASHRAE 62-2001, 2×VR, Econ, and DCV, an examination was undertaken for the two office types in each of the five climate categories defined by the Building America program. According to the 2012 Commercial Building Energy Consumption Survey (CBECS), 13% of U.S. offices are in hot-humid areas, 14% are in mixed-dry or hot-dry ones, 31% are in mixed-humid climates, 3% are in marine zones, and 39% are in cold or very cold climates. First, FIG. 10a shows the percentage of instances for which each strategy yielded the highest annual geometric mean VR. In most climate zones, the highest annual VR resulted from 2×VR, but it often came from economizing in Hot Dry and Mixed Dry climates (with high solar envelope gains compared to outdoor air enthalpy) and the mild Marine zone.

FIG. 10b shows the percentage of instances that each ventilation strategy led to the lowest loss. With Medium Parameters, the percentages were very similar to those depicted in FIG. 10a, meaning that most of the time the strategy that provided the most ventilation was the one that minimized loss—a result consistent with everything noted so far about the dominance of $IAQ_{profit}$ components. For Public & Planet, on the other hand, the lowest-loss strategies were much more varied. Simply doubling mechanical ventilation at all times (2×VR) was much less often favorable, and economizing was more often most favorable. In addition, both ASHRAE 62-2001 and DCV sometimes minimized loss in the small-CAV building, despite never producing the highest VR. With Public & Planet, the tradeoffs between categories became apparent, and the outcome-based strategy selection depended on specific building characteristics and outdoor conditions, like outdoor pollution and filter efficiency.

3.5 Case Studies

This section applies the loss framework to two variants of a small-CAV office building located in New York City. The office type is the same as already described, with building physical and efficiency parameters set at median, typical values. The only distinction between the two variants is that one has a typical particle filter ($\eta_{PM,mv}$=0.2) and the other has a superior one ($\eta_{PM,mv}$=0.7). For both case studies, natural infiltration was set at zero. The cases were simulated with constant design ventilation rates, or $VR_{des}$, from 5 to 50 L/s/occ in 5 L/s/occ intervals. In the absence of infiltration, the VR as already defined—the average outdoor air flow divided by the average occupancy—would be about 18% greater than $VR_{des}$, based on average occupancy. For example, a $VR_{des}$ of 10 L/s/occ would yield a VR of 11.8 L/s/occ.

3.5.1 Loss as a Function of VR, on Selected Days

FIG. 11 illustrates the losses associated with the six outcomes as a function of $VR_{des}$, with Medium Parameters in blue and Public & Planet in orange. For $L_{WP}$ and $L_{EA}$, the relations depend only on VR and do not vary by day of year, building, or other conditions. For $L_{PM}$, results are shown both for a low scenario (the superior filter case, with median outdoor $PM_{2.5}$ pollution) and a high scenario (the typical filter case, with high outdoor $PM_{2.5}$ concentration). $L_{oa}$ is shown for a day with relatively high outdoor ozone levels. $L_e$ is shown for a typical summer day (August 14), $L_g$ for a cold winter day (January 19), and the total energy, $L_g+L_e$, is shown for a spring day (April 15).

In terms of the $VR_{des}$ selected by an outcome-based approach, note in FIG. 11 the slopes of loss components as a function of $VR_{des}$. With Medium Parameters, it is clear on the strength of work performance impacts alone that the outcome-based $VR_{des}$ would be about 45 L/s/occ, above which there is no lost work performance. No other outcomes' loss may be sufficient to counteract $L_{WP}$ fully, although $L_{PM}$ on a polluted day with a typical filter, or $L_g$ on a cold winter day, could potentially lower the best $VR_{des}$ a little. For the Public & Planet profile, on the other hand, $L_{WP}$ is zero above about 17 L/s/occ, and the influence of $L_{EA}$ is diminished (and, as always, zero above 30 L/s/occ). At the same time, the slopes of $L_{PM}$, $L_e$, $L_g$, and $L_e+L_g$ are all much greater. Therefore, the outcome-based $VR_{des}$ may never exceed 30 L/s/occ except in free cooling situations, and could often be significantly lower.

3.5.2 Loss as a Function of VR Over the Year

FIG. 12 shows the loss associated with the six outcomes over the year, for both user profiles, and at 5, 10, 20, 30, and 50 L/s/occ. For both profiles it is clear that increasing ventilation above 5 L/s/occ generally reduced total loss. With Medium Parameters, every increase in $VR_{des}$ reduced loss, and did so for every day of the year. For Public & Planet, $VR_{des}$ increases up to between 20 and 30 L/s/occ reduced loss at most times. Increasing $VR_{des}$ shifted the loss makeup from approximately equal parts energy, work performance, excess absenteeism, and $PM_{2.5}$, to loss made up of energy and $PM_{2.5}$. With the greater value accorded electricity and $PM_{2.5}$, $VR_{des}$ above about 10 L/s/occ increased total loss in the early summer, around June 1. This indicates that an ideal $VR_{des}$ would not be constant for the year.

FIG. 13 is similar but for the variant with a superior PM filter that captures 70% of outdoor $PM_{2.5}$ on a single pass. Compared to the office with a typical filter with an efficiency of 20%, the contribution of $L_{PM}$ to the total loss was much smaller. Indeed, even with the Public & Planet profile where $P_{PM}$ is based on the 95th percentile scientific estimate, the superior filter succeeds in nearly eliminating loss associated with $PM_{2.5}$ exposure. This example illustrates a key point, which is that if high VR strategies are used in buildings to realize positive performance and absentee benefits, high efficiency filtration should accompany those strategies to mitigate indoor associated $PM_{2.5}$ exposure.

3.5.3 Outcome-Based VRs Over the Year

FIG. 14 illustrates the total loss (indicated by color) over the year as a function of $VR_{des}$, for both user profiles and both case study variants. With Medium Parameters (top row), for both filter conditions, loss decreased consistently from low to high $VR_{des}$. For the typical filter, the relationship between $VR_{des}$ and L varied somewhat over the year, because of the greater loss associated with $PM_{2.5}$ during a few high outdoor air pollution weeks; for the superior filter, it was remarkably consistent because, with $PM_{2.5}$ effectively filtered, all impacts other than productivity and sick leave were comparatively marginal. For Public & Planet (bottom row), the relation between $VR_{des}$ and L was both less strong and less one-directional, and ventilation was generally less able to produce large changes in the total loss magnitude. In particular, with the typical filter, there were times of the year with high loss that could not be fully reduced by changing $VR_{des}$.

The outcome-based $VR_{des}$—i.e., the $VR_{des}$ that produced the lowest loss—is indicated by the black dots in FIG. 15. With Medium Parameters, regardless of filter quality, it was either 45 or 50 L/s/occ all year. With Public & Planet values, the outcome-based $VR_{des}$ was 30 L/s/occ for large portions of summer, fall, and especially spring (for both filter conditions, but somewhat more in the summer and fall with the superior filter). In the winter, the outcome-based $VR_{des}$ was much lower, very rarely exceeding 15 L/s/occ with the typical filter or 20 L/s/occ with the superior filter. In all seasons, when the outcome-based $VR_{des}$ was not 30 L/s/cc, it was most often 10 or 15 L/s/occ with a typical filter (although values as low as 5 L/s/occ were observed) and 15 or 20 L/s/occ with a superior filter (and almost never lower). For both filter conditions, the middle ground of 25 L/s/occ was almost never loss-minimal.

With Medium Parameters, simply setting the design VR to 50 L/s/occ and employing fixed ventilation all year would practically achieve minimal loss. However, for a profile similar to Public & Planet, there is no existing ventilation strategy that would have a similar annual profile to the one produced by intentionally minimizing loss in an outcome-based approach.

4. Dynamic Pricing of Electricity

Dynamic pricing structures are relevant in smart-grid settings, for time-of-use pricing and demand-response applications. They might also be needed if social costs change as a supply mix changes, for example, with intermittent use of on-site solar. In either case, the loss is then the integration over time of the product of instantaneous price and the consumption rate $E_e'(t)(kW)$.

$$L_e = \frac{1}{\sum_h} \int_{t_0}^{t_f} P_e(t) E_e'(t) dt \tag{16}$$

4.1 Social Cost of Electricity Use

The social cost of carbon ($SC\text{-}CO_2$) is perhaps the best-known social cost. It can be thought of as the contribution of a marginal unit of energy to climate change damages, or as the necessary trajectory of energy cost increases to reduce demand to meet emissions reduction targets. The US Government Interagency Working Group on Social Cost of Greenhouse Gases and the U.S. EPA estimated $SC\text{-}CO_2$ values ranging from $13-130 per ton of $CO_2$ emitted (in 2016 US$). The low estimate is for a high discount rate (5%), indicating low present valuation of future impacts, and the highest value is for a close to worst-case (95th percentile) future damage scenario. More conservatively, others have estimated the 2015 $SC\text{-}CO_2$ at $23 per ton of $CO_2$. Recently, some have incorporated feedbacks between climate change economic impacts and the discount rate, and determined the optimal $SC\text{-}CO_2$ trajectory to limit global temperature rise to 1.5° C.; the value of that trajectory in 2015 was $220 per ton of $CO_2$.

For electricity generation, one can use $SC\text{-}CO_2$ values with source emission factors—i.e., ton of $CO_2$ emitted per kWh delivered—to determine the climate change social cost of electricity consumption. Table 9 shows resulting figure for fossil fuel generation sources. For the total U.S. electric grid, the marginal value of climate impacts ranges from 0.9-15.6 ¢/kWh.

TABLE 9

Climate change components of $P_e$, in U.S. cents per kWh, for fossil fuel generation sources and the marginal value for the U.S. electric grid, at multiple social costs of carbon dioxide (SC-CO$_2$) emission estimates. Note for natural gas, the estimates are only for CO$_2$ from combustion, not warming due to methane leakage.

| Generation source | Emission factor (ton CO$_2$ per kWh) | SC-CO$_2$ = $13/ton | SC-CO = $23/ton | SC-CO$_2$ = $45/ton | SC-CO$_2$ = $67/ton | SC-CO$_2$ = $130/ton | SC-CO$_2$ = $220/ton |
|---|---|---|---|---|---|---|---|
| Coal | 9.93E−04 | 1.3 | 2.2 | 4.4 | 6.7 | 12.9 | 21.8 |
| Natural gas | 3.93E−04 | 0.5 | 0.9 | 1.8 | 2.7 | 5.1 | 8.7 |
| Oil | 5.37E−04 | 1.1 | 1.9 | 3.7 | 5.6 | 10.9 | 18.4 |
| Marginal (non-baseload) national grid | 7.03E−04 | 0.9 | 1.6 | 3.1 | 4.7 | 9.2 | 15.5 |

Emission factors for electricity generation from US EPA (2016) GHG inventory figures and US EIA (2014) net generation figures Non-baseload factor from US EPA (2015) eGRID.
From left to right, SC-CO$_2$ values are from US EPA (2014) average scenario and 5% discount rate; Nordhaus (2014), US EPA (2014) average scenario and 3% discount rate; US EPA (2014) average scenario and 2.5% discount rate; US EPA (2014) 95th percentile scenario and 3% discount rate; and Moore and Diaz (2015).
EPA values are for costs in mid-2017, and others are for costs in 2015. All figures adjusted to 2016 US$.

There are also many non-climate impacts related to electricity generation from fossil fuels. Most important is probably exposure to combustion-related regional air pollution. Table 5 shows average combustion-related PM$_{2.5}$ health impacts for electricity generation by state. Even the states with the lowest estimates—Connecticut, Maine, Nevada, and Oregon—have combustion-related externalities 3-6 ¢/kWh, or 25-70% as much as those states' respective median commercial retail utility rates. The most affected states are those like Maryland (71 ¢/kWh), Pennsylvania (51 ¢/kWh), and Ohio (48 ¢/kWh), with continued reliance on coal-fired generation and significant population centers, and where PM$_{2.5}$ exposure externalities are 5 to 6 times as great as the direct cost of electricity.

Table 6 summarizes the range of impact estimates for electricity, for multiple types of externalities, including climate-related and combustion-related costs as well other externalities like environmental damages due to fuel extraction and reduced agricultural yields as a function of pollution. The estimate range is large. For example, one group states that the national PM$_{2.5}$ exposure cost estimate is 14-35 ¢/kWh, but others only estimated it at 2 ¢/kWh. Summing the literature estimates of the various social costs yields a range 4.8-53.6 ¢/kWh, for the U.S. average. Excluding combustion-related public health impacts, which can be added for a particular state from Table 5 in the published article, U.S. average social cost totals are 3.2-18.6 ¢/kWh.

4.2 Social Cost of On-Site Natural Gas Use

Natural gas delivered for consumption on site for space or water heating also has significant externalities. Table 10 summarizes climate change impacts per kWh of delivered heat content of natural gas, at multiple SC-CO$_2$ values.

TABLE 10

Social costs of purchased natural gas for on-site combustion, per kWh of delivered heat content, at six possible social cost of carbon dioxide (SC-CO$_2$) values. The first line assumes no methane leakage. The remainder of the table uses hypothetical leakage rate at two different time horizons to calculate prices including climate impacts of methane leakage.

| Leakage rate | Time horizon[2] (years) | Emission factor (toll CO$_2$e per kWh) | SC-CO$_2$ = $13/ton | SC-CO = $23/ton | SC-CO$_2$ = $45/ton | SC-CO$_2$ = $67/ton | SC-CO$_2$ = $130/ton | SC-CO$_2$ = $220/ton |
|---|---|---|---|---|---|---|---|---|
| 0% | — | 1.81E−04 | 0.2 | 0.4 | 0.8 | 1.2 | 2.4 | 4.0 |
| 1% | 100 | 2.03E−04 | 0.3 | 0.5 | 0.9 | 1.4 | 2.6 | 4.5 |
| 3% | 100 | 2.49E−04 | 0.3 | 0.6 | 1.1 | 1.7 | 3.2 | 5.5 |
| 5% | 100 | 2.97E−04 | 0.4 | 0.7 | 1.3 | 2.0 | 3.9 | 6.5 |
| 10% | 100 | 4.26E−04 | 0.6 | 1.0 | 1.9 | 2.9 | 5.5 | 9.4 |
| 1% | 20 | 2.37E−04 | 0.3 | 0.5 | 1.1 | 1.6 | 3.1 | 5.2 |
| 3% | 20 | 3.54E−04 | 0.5 | 0.8 | 1.6 | 2.4 | 4.6 | 7.8 |
| 5% | 20 | 4.75E−04 | 0.6 | 1.1 | 2.1 | 3.2 | 6.2 | 10.4 |
| 10% | 20 | 8.01E−04 | 1.0 | 1.8 | 3.6 | 5.4 | 10.4 | 17.6 |

The global warming potential (GWP) of methane is 34 times that of CO$_2$ over a 100 year time horizon, and 86 times as great over a 20 year horizon (Myhre et al., 2013).

Assuming no methane leakage, the climate-related externality price is 0.2-4.0 ¢/kWh. These prices are much lower than those associated with using natural gas for electricity generation, where about two thirds of heat content is not converted to electricity. However, if methane leakage during extraction and transportation is taken into account, the climate change social costs associated with natural gas use could be much larger.

The U.S. EPA estimates a leakage rate of 2.5% for conventional gas and 4.0% for hydraulically fractured shale gas. (This would imply a 3.5% overall leakage rate, since in 2015 about two-thirds of U.S. natural gas was produced by hydraulic fracturing.) Some researchers have endorsed this rough magnitude, but lower estimates also exist. Other research has suggested that methane emissions associated with natural gas production may be significantly greater, and that wells may leak substantially more methane than expected, potentially for a very long time after production has ceased, and that methane emissions from shale gas production systems can rise even as drilling activity declines. In addition, recent studies suggest urban distribution infrastructure could be a significant loss pathway, leaking an estimated 2.7% in the local system in Boston, for example.

The other significant influence on the climate impact of methane is the time horizon, since methane does not persist in the atmosphere as long as does $CO_2$. Some have argued that a 100-year horizon is appropriate under an assumption of gradual change, while others hold that a 20-year frame is also important to avoid sudden climate system tipping points that could create feedback effects. Table 10 includes estimates for both, at four hypothetical natural gas system leakage rates, for both time horizons' methane global warming potential.

In terms of non-climate-change externalities, there are many associated with natural gas extraction, particularly with shale gas. Summarizing the many, they include: use and pollution of fresh water, local air pollution from diesel pumps and trucks, leakage and accidents at sites and pipelines, toxic and radioactive wastewater and hazardous waste, local health impacts ranging from increased asthma incidence to potential miscarriages and cancers, earthquakes, reduced property values, and significant public expense for infrastructure and environmental remediation. Small boilers and furnaces appears to have few impacts on local ozone or $PM_{2.5}$ levels that would affect public health, and while there could potentially be other combustion products with health impacts, these have not been conclusively investigated or quantified.

4.3 Employee Compensation

Table 11 shows employment numbers, hourly wages, and hourly compensations for employment activities that take place in offices, compiled from the U.S. Bureau of Labor Statistics (BLS). The weighted average hourly wage was $31, while the total compensation including benefits was $46 per hour.

TABLE 11

Summary of occupation categories, base wages, and total compensation per hour for U.S. office workers

| U.S. Bureau of Labor Statistice (BLS) category | BLS code | Employment (millions) | Fraction of office workers (%) | Average wage ($/h) | Average compensation ($/h) |
| --- | --- | --- | --- | --- | --- |
| Management Occupations | 11-0000 | 6.9 | 14% | $58 | $86 |
| Business and Financial Operations Occupations | 13-0000 | 7.0 | 14% | $37 | $55 |
| Office and Administrative Support Occupations | 43-0000 | 21.8 | 44% | $18 | $27 |
| Computer and Mathematical Occupations | 15-0000 | 4.0 | 8% | $44 | $64 |
| Building Cleaning Workers | 37-2010 | 3.1 | 6% | $13 | $19 |
| Supervisors of Building, Grounds, and Maintenance Workers | 37-1000 | 0.3 | 1% | $22 | $32 |
| Architecture and Engineering Occupations | 17-0000 | 2.5 | 5% | $42 | $62 |
| Legal Occupations | 23-0000 | 1.1 | 2% | $52 | $77 |
| Art and Design Workers | 27-1000 | 0.6 | 1% | $26 | $39 |
| Media and Communication Workers | 27-3000 | 0.6 | 1% | $31 | $46 |
| Media and Communication Equipment Workers | 27-4000 | 0.2 | 0% | $27 | $40 |
| Sales Representatives, Services | 41-3000 | 1.8 | 4% | $35 | $51 |
| Weighted average | — | 49.9 | 100% | $31 | $46 |

CONCLUSION

This system and framework presents an outcome-based ventilation (OBV) framework for making decisions about ventilation strategies and rates in commercial buildings by combining IAQ and energy outcomes into a loss function. Such a framework may be incorporated into climate control systems in buildings or homes.

While the invention is been described with reference to the embodiments above, a person of ordinary skill in the art would understand that various changes or modifications may be made thereto without departing from the scope of the claims.

The invention claimed is:

1. A ventilation control system, comprising:
a ventilation system that provides air circulation to a building;
a controller that controls the ventilation system based on inputs, wherein the inputs comprise a current ventilation rate; and
an optimization system that drives the controller, to control the ventilation system, based at least on a corresponding value for each of factors comprising building and pollution transport models; scientific estimates of ventilation impacts on productivity, sick leave, and health; user preference parameters; and pollution forecast and price forecast, wherein the corresponding values are computed based on a user-provided guidance for each of the factors.

2. The ventilation control system of claim 1, wherein the current ventilation rate is determined by a combination of flow sensing at a building air handling unit and occupancy scheduling.

3. The ventilation control system of claim 1, wherein the current ventilation rate is determined by one or more carbon dioxide (CO2) sensors.

4. The ventilation control system of claim 1, wherein the inputs further comprise a current indoor temperature and wherein the current indoor temperature input is an average across zones served by the ventilation system.

5. The ventilation control system of claim 1, wherein the inputs further comprise a current indoor temperature and wherein the current indoor temperature input is determined by a return air temperature as a proxy for temperature measurement.

6. The ventilation control system of claim 1, wherein the inputs further comprise a total rate of supply air flow.

7. A ventilation control system comprising an optimization system that drives a controller based at least on a corresponding value for each of factors comprising building and pollution transport models; scientific estimates of ventilation impacts on productivity, sick leave, and health; user preference parameters; and pollution forecast and price forecast, wherein the corresponding values are computed based on a user-provided guidance for each of the factors.

8. The ventilation control system of claim 7, wherein the controller controls a ventilation system based on inputs, wherein the inputs comprise a current ventilation rate determined by a combination of flow sensing at a building air handling unit and occupancy scheduling.

9. The ventilation control system of claim 8, wherein the current ventilation rate is determined by one or more carbon dioxide (CO2) sensors.

10. The ventilation control system of claim 8, wherein the inputs further comprise a current indoor temperature and the current indoor temperature input is an average across zones served by the ventilation system.

11. The ventilation control system of claim 8, wherein the inputs further comprise a current indoor temperature and wherein the current indoor temperature input is determined by a return air temperature as a proxy for temperature measurement.

12. The ventilation control system of claim 8, wherein the inputs further comprise a total rate of supply air flow.

13. A method to control ventilation, the method comprising:
providing air circulation, by a ventilation system, to a building;
controlling the ventilation system, by a controller, based on inputs, wherein the inputs comprise a current ventilation rate; and
driving the controller, by an optimization system, to control the ventilation system based at least on a corresponding value for each of factors comprising building and pollution transport models; scientific estimates of ventilation impacts on productivity, sick leave, and health; user preference parameters; and pollution forecast and price forecast, wherein the corresponding values are computed based on a user-provided guidance for each of the factors.

14. The method of claim 13 further comprising: determining the current ventilation rate by a combination of flow sensing at a building air handling unit and occupancy scheduling.

15. The method of claim 13 further comprising: determining the current ventilation rate by one or more carbon dioxide (CO2) sensors.

16. The method of claim 13, wherein the inputs further comprise a current indoor temperature and wherein the current indoor temperature input is an average across zones served by the ventilation system.

17. The method of claim 13, wherein the inputs further comprise a current indoor temperature and wherein the current indoor temperature input is determined by a return air temperature as a proxy for temperature measurement.

18. The method of claim 13, wherein the inputs further comprise a total rate of supply air flow.

* * * * *